(12) United States Patent
Moon et al.

(10) Patent No.: US 11,133,710 B2
(45) Date of Patent: Sep. 28, 2021

(54) SYSTEM AND DEVICE FOR TRANSMISSION AND RECEPTION OF WIRELESS POWER

(71) Applicant: LG ELECTRONICS INC., Seoul (KR)

(72) Inventors: Hyunwook Moon, Seoul (KR); Yangkyeong Kim, Seoul (KR); Euisung Kim, Seoul (KR); Hojae Sung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/044,302

(22) PCT Filed: Apr. 9, 2019

(86) PCT No.: PCT/KR2019/004219
§ 371 (c)(1),
(2) Date: Sep. 30, 2020

(87) PCT Pub. No.: WO2019/199029
PCT Pub. Date: Oct. 17, 2019

(65) Prior Publication Data
US 2021/0159730 A1    May 27, 2021

(30) Foreign Application Priority Data
Apr. 9, 2018 (KR) .................... 10-2018-0041166

(51) Int. Cl.
*H02J 7/02* (2016.01)
*H04B 5/00* (2006.01)
(Continued)

(52) U.S. Cl.
CPC .............. *H02J 50/10* (2016.02); *H02J 7/02* (2013.01); *H02J 50/40* (2016.02); *H02J 50/70* (2016.02);
(Continued)

(58) Field of Classification Search
CPC .. H02J 50/10; H02J 50/80; H02J 50/40; H02J 50/70; H02J 7/02; H02J 50/60;
(Continued)

(56) References Cited

U.S. PATENT DOCUMENTS 10,348,116 B2 * 7/2019 Arendarik ............... H02J 50/10
10,381,881 B2 * 8/2019 Wittenberg ............. H02J 50/40
(Continued)

FOREIGN PATENT DOCUMENTS

KR     101153179     6/2012
KR     101834385     3/2018
(Continued)

OTHER PUBLICATIONS

PCT International Application No. PCT/KR2019/004219, International Search Report dated Jul. 17, 2019, 4 pages.

*Primary Examiner* — Jared Foreman
*Assistant Examiner* — Michael J Warmflash
(74) *Attorney, Agent, or Firm* — Lee, Hong, Degerman, Kang & Waimey

(57) ABSTRACT

The present disclosure relates to a wireless power reception device and method, and provides a wireless power reception device comprising: a secondary coil which is magnetically coupled to a primary coil disposed in a wireless power transmission device so as to receive wireless power from the wireless power transmission device; a shielding member for supporting the secondary coil; a power pickup unit including a rectifier circuit for rectifying an alternating current signal according to the wireless power received by the secondary coil into a direct current signal; and a communication/control unit for controlling transmission of the wireless power and communicating with the wireless power transmission device. On the basis of a secondary coil and a shielding member according to the present embodiment, slimming of an applied product can be achieved and, simul-
(Continued)

taneously, the same target performance index (which is required for the standard medium power level (for example, 60W)) can be implemented.

15 Claims, 34 Drawing Sheets

(51) Int. Cl.
*H02J 50/10* (2016.01)
*H02J 50/70* (2016.01)
*H02J 50/80* (2016.01)
*H02J 50/40* (2016.01)
H01F 27/36 (2006.01)
*H02J 50/60* (2016.01)
H01F 38/14 (2006.01)

(52) U.S. Cl.
CPC ............ *H02J 50/80* (2016.02); *H04B 5/0031* (2013.01); *H04B 5/0075* (2013.01); *H01F 27/36* (2013.01); *H01F 38/14* (2013.01); *H02J 50/60* (2016.02)

(58) Field of Classification Search
CPC ..... H04B 5/0075; H04B 5/0031; H01F 38/14; H01F 27/36
See application file for complete search history.

(56) References Cited

U.S. PATENT DOCUMENTS

| | | | |
|---|---|---|---|
| 10,856,368 B2 * | 12/2020 | Yoshino | H05B 6/062 |
| 2014/0361739 A1 * | 12/2014 | Kwak | H02J 7/025 |
| | | | 320/108 |
| 2015/0163864 A1 * | 6/2015 | Baarman | H02J 5/005 |
| | | | 99/358 |
| 2016/0182826 A1 * | 6/2016 | Blum | H02J 50/10 |
| | | | 348/372 |
| 2017/0040826 A1 * | 2/2017 | Arendarik | H02J 50/40 |
| 2017/0324450 A1 * | 11/2017 | Lee | H04B 5/0093 |
| 2017/0361725 A1 * | 12/2017 | Seong | B60L 11/1829 |
| 2019/0074724 A1 * | 3/2019 | Wittenberg | H01F 38/14 |
| 2019/0074729 A1 * | 3/2019 | Wittenberg | H02J 50/90 |
| 2019/0312464 A1 * | 10/2019 | Park | H02J 7/00304 |
| 2019/0363565 A1 * | 11/2019 | Graham | H01F 38/14 |
| 2020/0260900 A1 * | 8/2020 | Kim | H05B 6/1236 |
| 2020/0267806 A1 * | 8/2020 | Nam | H05B 6/062 |

FOREIGN PATENT DOCUMENTS

| | | |
|---|---|---|
| WO | 2017064803 | 4/2017 |
| WO | 2018024913 | 2/2018 |

* cited by examiner

FIG. 3B

|  | b7 | b6 | b5 | b4 | b3 | b2 | b1 | b0 |
|---|---|---|---|---|---|---|---|---|
| Byte 0 | Application Profile ||||||||
| Byte 1 | Version ||||||||
| Byte 2-N-1 | Profile-specific data ||||||||

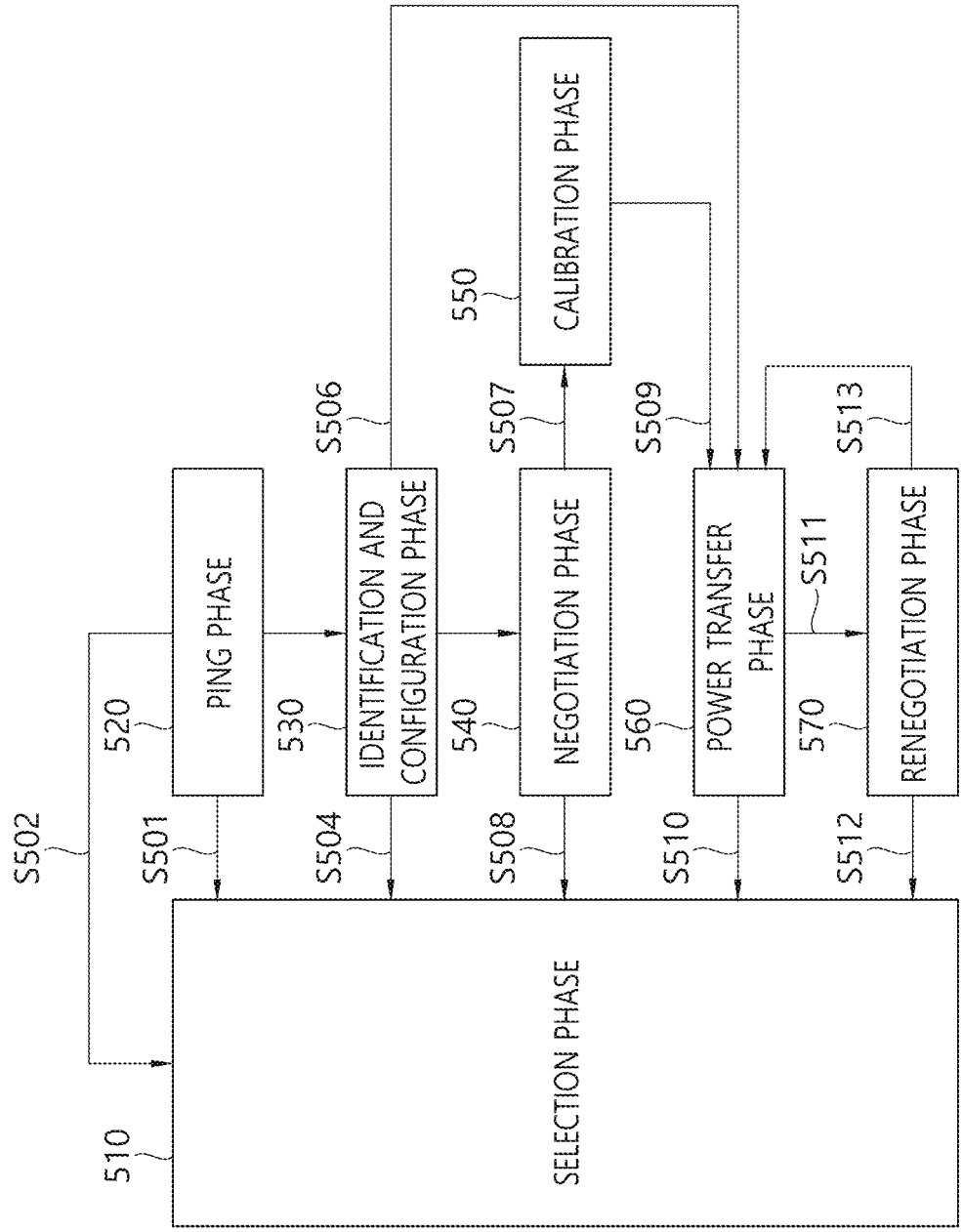

FIG. 10

| Preamble | ZERO | Response | Type | Info | Parity |
|---|---|---|---|---|---|

Response
'00' : no comms
'01' : comms error
'10' : NAK
'11' : ACK

Type
ZERO : slot sync
ONE : frame sync

Parity : odd

Info (Type is ZERO)
'00' : allocated
'01' : locked
'10' : free
'11' : reserved

Info (Type is ONE)
'00' : slotted
'01' : frees format
'10' : reserved
'11' : reserved

FIG. 13

| Class | Reference Transmitter | | | | Reference Appliance | | | |
|---|---|---|---|---|---|---|---|---|
| | $f_{p\,nom}$ (kHz) | $L_{p\,nom}$ (µH) | $f_{op}$ (kHz) | $K_{nom}$ | $f_{s\,nom}$ (kHz) | $L_{s\,nom}$ (µH) | $U_{L\,nom}$ (V) | $P_{L\,nom}$ (W) |
| A | 27 | 58 | 35.0 | 0.45 | 30 | 210 | 115 | 200 |
| B | 27 | 58 | 24.6 | 0.55 | 30 | 140 | 115 | 1200 |
| present embodime | 27 | 48 | 37 | 0.65 | 30 | 90 | 220 | 1500 |
| C | 27 | 58 | 23.9 | 0.72 | 30 | 210 | 230 | 2400 |

FIG. 17
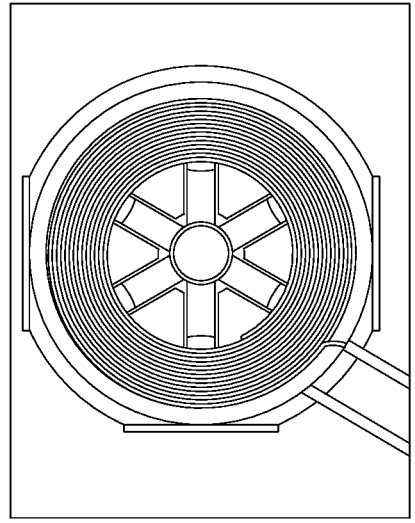
(a) 20 Turns
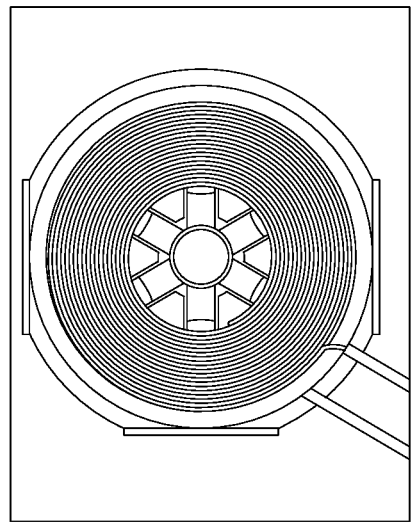
(b) 15 Turns
|  | Primary resonance current | Secondary resonance current | RX Power | TX Power | Efficiency |
|---|---|---|---|---|---|
|  | [Arms] | [Arms] | [W] | [W] |  |
| 20 Turns | 32.30 | 11.36 | 1744.20 | 2041.50 | 85.4% |
| 15 Turns | 37.50 | 9.82 | 1642.34 | 1959.49 | 83.8% |

FIG. 18

| Coil Assy. A | | Lp | Rp | Primary Cap | Ls | Rs | La | Lb | Secondary Cap | M | K | @ 10kHz ΔK |
|---|---|---|---|---|---|---|---|---|---|---|---|---|
| TX/RX | True Centering(0mm) | 48.77 | 0.083 | 0.78 | 112.61 | 0.143 | 250.67 | 72.37 | 0.26 | 44.57 | 0.601 | - |
| | Eccentricity(25mm) | 45.86 | 0.086 | | 104.01 | 0.148 | 215.34 | 85.24 | | 32.52 | 0.471 | 0.131 |
| Resonance freq. [kHz] | True Centering(0mm) | 25.806 | | | 29.413 | | 3.61 | | | | | |
| | Eccentricity(25mm) | 26.611 | | | 30.605 | | | | | | | |

28 Turn(RX)

FIG. 20

| Std Order | Run Order | Center Pt | Blocks | Ferrite Number | Ferrite Length | 1st Current | 2nd Current | Freq. | Vload | Iload | Watt (1st) | Watt (2nd) | Efficiency | M | K | Coil Assy. # | Turns | Compens. Cap. |
|---|---|---|---|---|---|---|---|---|---|---|---|---|---|---|---|---|---|---|
| 12 | 1 | 0 | 1 | 6 | 55 | 33.31 | 10.28 | 34.55 | 197.16 | 9.08 | 2035.85 | 1707.66 | 83.88 | 26.27 | 0.432 | A | 28 | 0.33 |
| 11 | 2 | 0 | 1 | 6 | 55 | 33.59 | 10.34 | 34.51 | 197.22 | 9.08 | 2034.78 | 1708.26 | 83.95 | 26.27 | 0.430 | A | 28 | 0.33 |
| 8 | 3 | -1 | 1 | 6 | 65 | 29.69 | 10.57 | 34.10 | 198.37 | 9.16 | 2009.13 | 1729.80 | 86.10 | 28.18 | 0.437 | F | 28 | 0.30 |
| 6 | 4 | -1 | 1 | 8 | 55 | 29.94 | 10.39 | 34.44 | 198.53 | 9.15 | 2013.64 | 1731.97 | 86.01 | 29.24 | 0.452 | I | 28 | 0.30 |
| 4 | 5 | 1 | 1 | 8 | 65 | 28.85 | 10.30 | 33.58 | 199.89 | 9.22 | 2022.69 | 1755.24 | 86.78 | 33.20 | 0.478 | B | 28 | 0.30 |
| 5 | 6 | -1 | 1 | 4 | 55 | 35.92 | 10.31 | 34.32 | 193.03 | 8.97 | 2015.96 | 1638.58 | 81.28 | 22.80 | 0.411 | H | 28 | 0.33 |
| 13 | 7 | 0 | 1 | 6 | 55 | 33.56 | 10.35 | 34.34 | 197.23 | 9.08 | 2033.61 | 1708.32 | 84.00 | 26.27 | 0.430 | A | 28 | 0.33 |
| 2 | 8 | 1 | 1 | 8 | 45 | 35.58 | 10.19 | 34.23 | 194.18 | 8.96 | 2016.34 | 1656.27 | 82.14 | 25.21 | 0.428 | C | 28 | 0.33 |
| 3 | 9 | 1 | 1 | 4 | 65 | 34.13 | 10.55 | 34.13 | 196.51 | 9.10 | 2042.24 | 1691.74 | 83.11 | 26.22 | 0.444 | D | 28 | 0.33 |
| 9 | 10 | 0 | 1 | 6 | 55 | 33.36 | 10.29 | 34.57 | 196.42 | 9.05 | 2019.24 | 1694.72 | 83.78 | 26.27 | 0.430 | A | 28 | 0.33 |
| 1 | 11 | 1 | 1 | 4 | 45 | 42.31 | 10.05 | 34.15 | 187.62 | 8.72 | 2019.79 | 1547.72 | 76.63 | 18.98 | 0.374 | E | 28 | 0.39 |
| 10 | 12 | 0 | 1 | 6 | 55 | 33.41 | 10.29 | 34.57 | 196.43 | 9.05 | 2017.43 | 1694.71 | 84.00 | 26.27 | 0.430 | A | 28 | 0.33 |
| 7 | 13 | -1 | 1 | 6 | 45 | 37.76 | 10.81 | 34.25 | 192.80 | 8.94 | 2032.54 | 1634.28 | 80.41 | 22.30 | 0.403 | G | 28 | 0.33 |

| Set number | Factor level | | 2)Cost (Coil Assy.) | Response surface equation | | Priority |
|---|---|---|---|---|---|---|
| | Ferrite Number | Ferrite Length | | Primary resonance current | Efficiency | |
| 1 | 7 | 65 | 7,668WON | 29.39 | 86.54 | 3 |
| 2 | 8 | 65 | 7,894WON | 27.89 | 86.96 | 1 |
| 3 | 8 | 60 | 7,753WON | 28.74 | 86.59 | 2 |

FIG. 22A

| Assy# | Input Power[W] | Output Power[W] | Efficiency[%] |
|---|---|---|---|
| 1 | 2008.36 | 1753.45 | 87.31 |
| 2 | 2022.71 | 1763.31 | 87.18 |
| 3 | 2007.31 | 1759.68 | 87.66 |
| 4 | 2007.31 | 1759.68 | 87.66 |
| 5 | 2022.06 | 1758.82 | 86.98 |
| 6 | 2010.57 | 1758.60 | 87.47 |
| 7 | 2024.71 | 1770.17 | 87.43 |
| 8 | 2005.16 | 1752.94 | 87.42 |
| 9 | 2021.13 | 1761.60 | 87.16 |
| 10 | 2012.13 | 1747.12 | 86.83 |

FIG. 23A

| Assy# | Current (Arms) |
|---|---|
| 1 | 27.55 |
| 2 | 27.84 |
| 3 | 26.92 |
| 4 | 26.92 |
| 5 | 28.03 |
| 6 | 27.33 |
| 7 | 27.51 |
| 8 | 27.29 |
| 9 | 27.82 |
| 10 | 28.23 |

FIG. 24A

| Assy# | Input Power[W] | Output Power[W] | Efficiency[%] |
|---|---|---|---|
| 1 | 2003.02 | 1799.58 | 89.84 |
| 2 | 2004.67 | 1801.03 | 89.84 |
| 3 | 2006.98 | 1803.15 | 89.84 |
| 4 | 2011.39 | 1807.22 | 89.85 |
| 5 | 2017.66 | 1812.98 | 89.86 |
| 6 | 2051.08 | 1844.42 | 89.92 |
| 7 | 2020.18 | 1815.09 | 89.85 |
| 8 | 2003.34 | 1798.63 | 89.78 |
| 9 | 2027.00 | 1822.19 | 89.90 |
| 10 | 2009.33 | 1805.73 | 89.87 |

FIG. 25A

| Assy# | Eccentricity (Arms) |
|---|---|
| 1 | 23.22 |
| 2 | 23.22 |
| 3 | 23.32 |
| 4 | 23.32 |
| 5 | 23.34 |
| 6 | 23.35 |
| 7 | 23.29 |
| 8 | 23.27 |
| 9 | 23.19 |
| 10 | 23.20 |

FIG. 26

(a) Number of ferrite bars = 8, length of a ferrite bar = 65 mm

|  | Efficiency | Primary resonance current | Condition |
|---|---|---|---|
| Eccentricity(25mm) | 87.3% | 27.5Arms | Coil-to-coil distance 16mm<br>Tx reception power 2kW |
| True centering | 89.8% | 23.2Arms | |

(b) Number of ferrite bars = 8, length of a ferrite bar = 60 mm

|  | Efficiency | Primary resonance current | Condition |
|---|---|---|---|
| Eccentricity(25mm) | 86.6% | 28.7Arms | Coil-to-coil distance 16mm<br>Tx reception power 2kW |
| True centering | 89.3% | 23.9Arms | |

SYSTEM AND DEVICE FOR TRANSMISSION AND RECEPTION OF WIRELESS POWER

CROSS-REFERENCE TO RELATED APPLICATION

This application is the National Stage filing under 35 U.S.C. 371 of International Application No. PCT/KR2019/004219, filed on Apr. 9, 2019, which claims the benefit of earlier filing date and right of priority to Korean Application No. 10-2018-0041166, filed on Apr. 9, 2018, the contents of which are all incorporated by reference herein in their entirety.

BACKGROUND OF THE DISCLOSURE

Field of the Disclosure

The present disclosure relates to wireless charging and, more particularly, to a device and a method for controlling transmission of power in a wireless power transmitting system.

Related Art

Wireless power transmission technology refers to a technology transmitting power wirelessly between a power source and an electronic device. As one example, wireless power transmission technology allows people to charge the battery of a wireless terminal by simply placing the wireless terminal such as a smartphone or a tablet on a wireless charging pad, thereby providing mobility, convenience, and safety much better than experienced in a wired charging situation using an existing wired charging connector. Wireless power transmission technology is getting attention to replace the existing wired power transmission environment in various application fields including consumer electronics, industrial devices, military devices, automotive, infrastructure, and medical devices.

The Wireless Power Consortium (WPC), an organization leading standardization of the wireless power transmission technology, divides electronic devices into several groups according to the amount of power transmitted and received and develops standards for each group. For example, a first group is related to low power (less than about 5 W or less than about 20 W) standards targeted for wearable devices such as smart watches, smart glasses, Head Mounted Displays (HMDs), and smart rings and mobile electronic devices (or portable electronic devices) such as earphones, remote controllers, smartphones, PDAs, and table PCs. A second group is related to medium power (less than about 50 W or less than about 200 W) standards targeted for medium/small-scale electronic devices such as notebooks, robot vacuum cleaners, TVs, audio devices, vacuum cleaners, and monitors. A third group is related to high power (less than about 2 kW or less than 22 kW) standards targeted for kitchen appliances such as blenders, microwave ovens, and electric rice cookers and personal mobile devices (or electric devices/transport means) such as wheelchairs, electric kickboards, electric bicycles, and electric vehicles.

Low power standards have already been established in various versions, and commercialization based on the standards is actively pursued. Meanwhile, standards related to medium and high power are currently in development. Unlike low power wireless charging, medium power or high power wireless charging may cause various problems such as one related to safety due to a voltage induced up to several tens to several hundreds of volts and even cause an eccentricity problem (a situation in which primary coils and secondary coils are out of alignment) when low power wireless charging has also to be supported. Therefore, systems and devices for transmission and reception of wireless power to solve the problems are needed.

SUMMARY OF THE DISCLOSURE

A technical object of the present disclosure is to provide a system and a method for transmitting high density, high efficiency wireless power.

Another technical object of the present disclosure is to provide a primary coil, a secondary coil, and a shielding member applicable to medium power or high power wireless charging; and a method for fabricating them.

Yet another technical object of the present disclosure is to provide an optimal design structure of a wireless power transmitter for implementing high output wireless power transmission by using cooktop induction coils, an optimal design structure of a wireless power receiver for high density/high efficiency coupling with the wireless power transmitter, and a platform including the optimal design structures.

According to one aspect of the present disclosure, a wireless power transmitter is provided. The device comprises an integrated transmitting coil configured to transmit wireless power to a wireless power receiver through magnetic coupling with a secondary coil installed in the wireless power receiver or heat external objects; a magnetic circuit disposed on one surface of the integrated transmitting coil; a shielding member supporting the integrated transmitting coil and the magnetic circuit; a power conversion unit including an inverter being connected to the integrated transmitting coil to drive the integrated transmitting coil; and a communication & control unit configured to control the integrated transmitting coil in one of a heating mode or a wireless power transmission mode and perform communication with the wireless power receiver.

According to one aspect, if outer diameter $\phi$ of the secondary coil ranges from 13 to 16 cm and the wireless power receiver belongs to a class of output ranging from 1500 W to 2000 W, operating frequency of the integrated transmitting coil may be higher than the operating frequency for a class of higher output than the class, and inductance of the integrated transmitting coil may be smaller than the value required by a class of higher output than the class.

According to another aspect, electric or physical parameters of the integrated transmitting coil and the secondary coil may be designed to be associated with each other so that the wireless power receiver may receive power ranging from 1500 W to 2000 W with efficiency of more than 90%.

According to yet another aspect, magnetic coupling coefficient between the integrated transmitting coil and the secondary coil may be 0.65.

According to still another aspect, inductance of the integrated transmitting coil may be 44 µH or 45 µN, and inductance of the secondary coil may be 90 µH.

According to yet still another aspect, operating frequency of the integrated transmitting coil may range from 30 to 40 kHz.

According to still yet another aspect, operating frequency of the integrated transmitted coil may be 37 kHz.

According to further yet another aspect, outer diameter of the secondary coil may be 14 cm.

According to another aspect of the present disclosure, a wireless power receiver is provided. The device comprises a secondary coil configured to receive wireless power from a wireless power transmitter through magnetic coupling with an integrated transmitting coil installed in the wireless power transmitter; a magnetic circuit disposed on one surface of the secondary coil; a shielding member supporting the secondary coil and the magnetic circuit; a power pickup unit including a rectifier circuit rectifying an AC signal due to wireless power received by the secondary coil into a DC signal; and a communication & control unit configured to control transmission of the wireless power and perform communication with the wireless power transmitter.

According to one aspect, outer diameter $\phi$ of the secondary coil ranges from 13 to 16 cm, the wireless power receiver belongs to a class of output ranging from 1500 W to 2000 W, the operating frequency for receiving wireless power may be higher than the operating frequency for a class of higher output than the class, and inductance of the secondary coil may be smaller than the value required by a class of higher output than the class.

According to another aspect, the number of turns of the secondary coil may be 28 turns.

According to yet another aspect, electric or physical parameters of the secondary coil and the magnetic circuit may be designed so that transmission efficiency of 87% may be achieved when the secondary coil is eccentric by 25 mm from the integrated transmitting coil.

According to still another aspect, electric or physical parameters of the secondary coil and the magnetic circuit may be designed so that a resonance current of the integrated transmitting coil becomes 27 A(rms) when the secondary coil is eccentric by 25 mm from the integrated transmitting coil.

According to yet still another aspect, outer diameter $\phi$ of the secondary coil may be 14 cm, and inner diameter thereof may be 4 cm.

According to still yet another aspect, the magnetic circuit includes at least one ferrite bar, length of the at least one ferrite bar may be at least 60 mm, and the number of ferrite bars may be at least 7.

According to further yet another aspect, length of the at least one ferrite bar may be 65 mm, and the number of ferrite bars may be 8.

According to further still another aspect, distance between the integrated transmitting coil and the secondary coil may be designed to be 16 mm.

By using a secondary coil and a shielding member according to the present embodiment, application products may be made slim and at the same time, the same target performance index (which is required by standards for medium power class (for example, 60 W)) may be achieved.

BRIEF DESCRIPTION OF THE DRAWINGS

FIG. 3B shows an example of a WPC NDEF in a wireless power transfer system.

FIG. 5 is a state transition diagram for describing a wireless power transfer procedure.

FIG. 10 is a structure of a sync pattern according to an exemplary embodiment of the present disclosure.

FIG. 13 is a table summarizing electromagnetic design parameters of a wireless power transmitter.

FIG. 17 shows variations of a resonance current and efficiency of an integrated transmitting coil due to the number of turns of secondary coils according to one example.

FIG. 18 shows a measurement result of parameters of an integrated transmitting coil and a secondary coil to derive a preferred number of turns of the secondary coil.

FIG. 20 is a table showing an experimental result of FIG. 19.

FIG. 22A shows efficiency measured for each sample in an experiment according to one example.

FIG. 23A shows a resonance current of an integrated transmitting coil measured for each sample in an experiment of one example.

FIG. 24A shows efficiency measured for each sample in an experiment of another example.

FIG. 25A shows a resonance current of an integrated transmitting coil measured for each sample in an experiment of another example.

FIG. 26 shows a comparison result of electric/physical design parameters of a secondary coil assembly according to a preferred embodiment with a comparison group.

DESCRIPTION OF EXEMPLARY EMBODIMENTS

The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
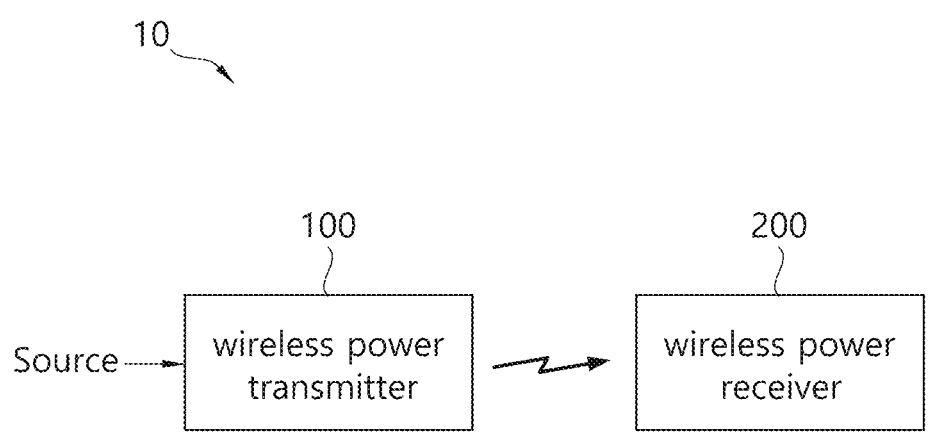
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
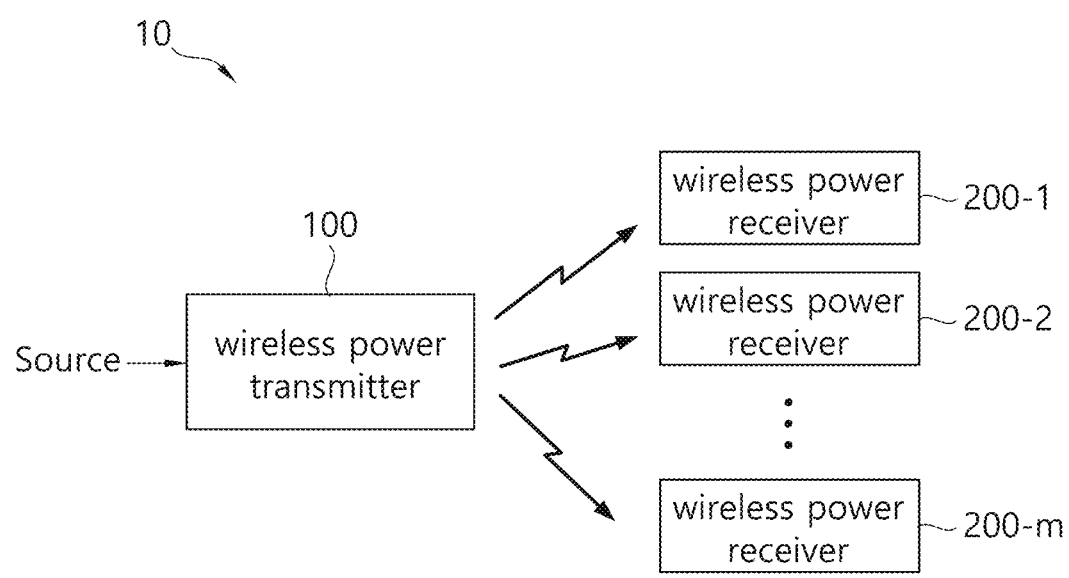
FIG. 2 is a block diagram of a wireless power system (10) according to another exemplary embodiment of the present disclosure.

In the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3A:
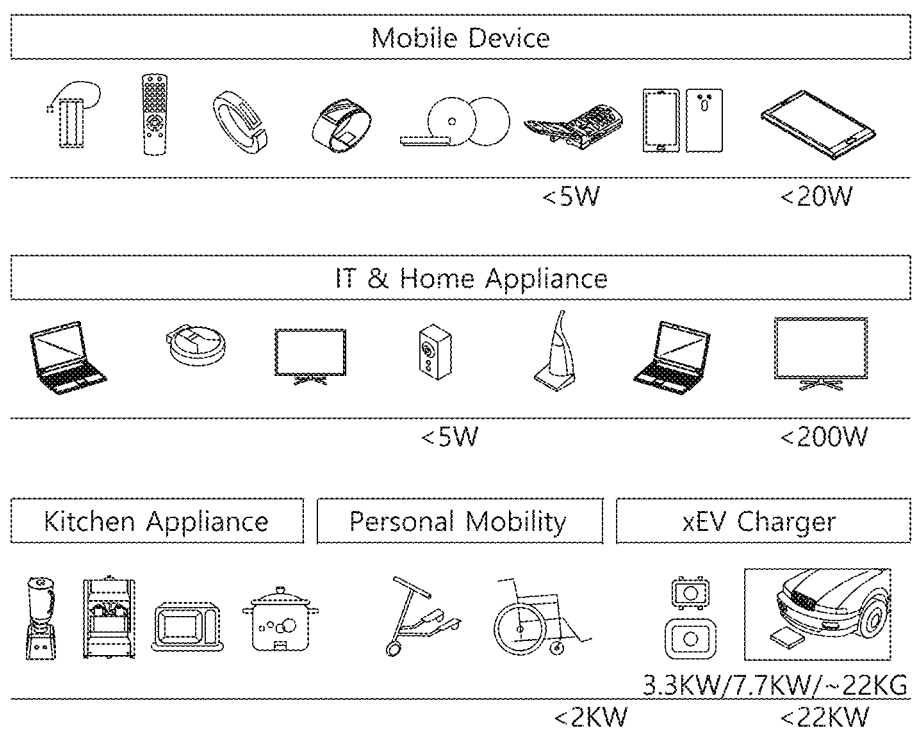
FIG. 3A shows an exemplary embodiment of diverse electronic devices adopting a wireless power transfer system.

FIG. 3a shows an exemplary embodiment of diverse electronic devices adopting a wireless power transfer system.

As shown in FIG. 3a, the electronic devices included in the wireless power transfer system are sorted in accordance with the amount of transmitted power and the amount of received power. Referring to FIG. 3a, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or re-charged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an overvoltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

As an example, a user may experience a smart wireless charging service in a hotel. When the user enters a hotel room and puts a smartphone on a wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when it is detected that wireless power is received, or when the smartphone receives information on the smart wireless charging service from the wireless charger, the smartphone enters a state of inquiring the user about agreement (opt-in) of supplemental features. To this end, the smartphone may display a message on a screen in a manner with or without an alarm sound. An example of the message may include the phrase "Welcome to ###hotel. Select" Yes" to activate smart charging functions: Yes|No Thanks." The smartphone receives an input from the user who selects Yes or No Thanks, and performs a next procedure selected by the user. If Yes is selected, the smartphone transmits corresponding information to the wireless charger. The smartphone and the wireless charger perform the smart charging function together.

The smart wireless charging service may also include receiving WiFi credentials auto-filled. For example, the wireless charger transmits the WiFi credentials to the smartphone, and the smartphone automatically inputs the WiFi credentials received from the wireless charger by running an appropriate application.

The smart wireless charging service may also include running a hotel application that provides hotel promotions or obtaining remote check-in/check-out and contact information.

As another example, the user may experience the smart wireless charging service in a vehicle. When the user gets in the vehicle and puts the smartphone on the wireless charger, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about checking identity.

In this state, the smartphone is automatically connected to the vehicle via WiFi and/or Bluetooth. The smartphone may display a message on the screen in a manner with or without an alarm sound. An example of the message may include a phrase of "Welcome to your car. Select "Yes" to synch device with in-car controls: Yes|No Thanks." Upon receiving the user's input to select Yes or No Thanks, the smartphone performs a next procedure selected by the user. If Yes is selected, the smartphone transmits corresponding information to the wireless charger. In addition, the smartphone and the wireless charger may run an in-vehicle smart control function together by driving in-vehicle application/display software. The user may enjoy the desired music and check a regular map location. The in-vehicle applications/display software may include an ability to provide synchronous access for passers-by.

As another example, the user may experience smart wireless charging at home. When the user enters the room and puts the smartphone on the wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about agreement (opt-in) of supplemental features. To this end, the smartphone may display a message on the screen in a manner with or without an alarm sound. An example of the message may include a phrase such as "Hi xxx, Would you like to activate night mode and secure the building?: Yes|No Thanks." The smartphone receives a user input to select Yes or No Thanks and performs a next procedure selected by the user. If Yes is selected, the smartphone transmits corresponding information to the wireless charger. The smartphones and the wireless charger may recognize at least user's pattern and recommend the user to lock doors and windows, turn off lights, or set an alarm.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF). The WPC NDEF may include, for example, an application profile field (e.g., 1B), a version field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | PTX_IN_MAX | Minimum category support requirement | Minimum value for a maximum number of supported devices |
| --- | --- | --- | --- |
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | PRX_OUT_MAX' | Exemplary application |
| --- | --- | --- |
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

As shown in Table 1, a maximum output power capability of Class n PTU may be equal to or greater than the PTX_IN_MAX of the corresponding class. The PRU cannot draw a power that is higher than the power level specified in the corresponding category.

Figure 4A:
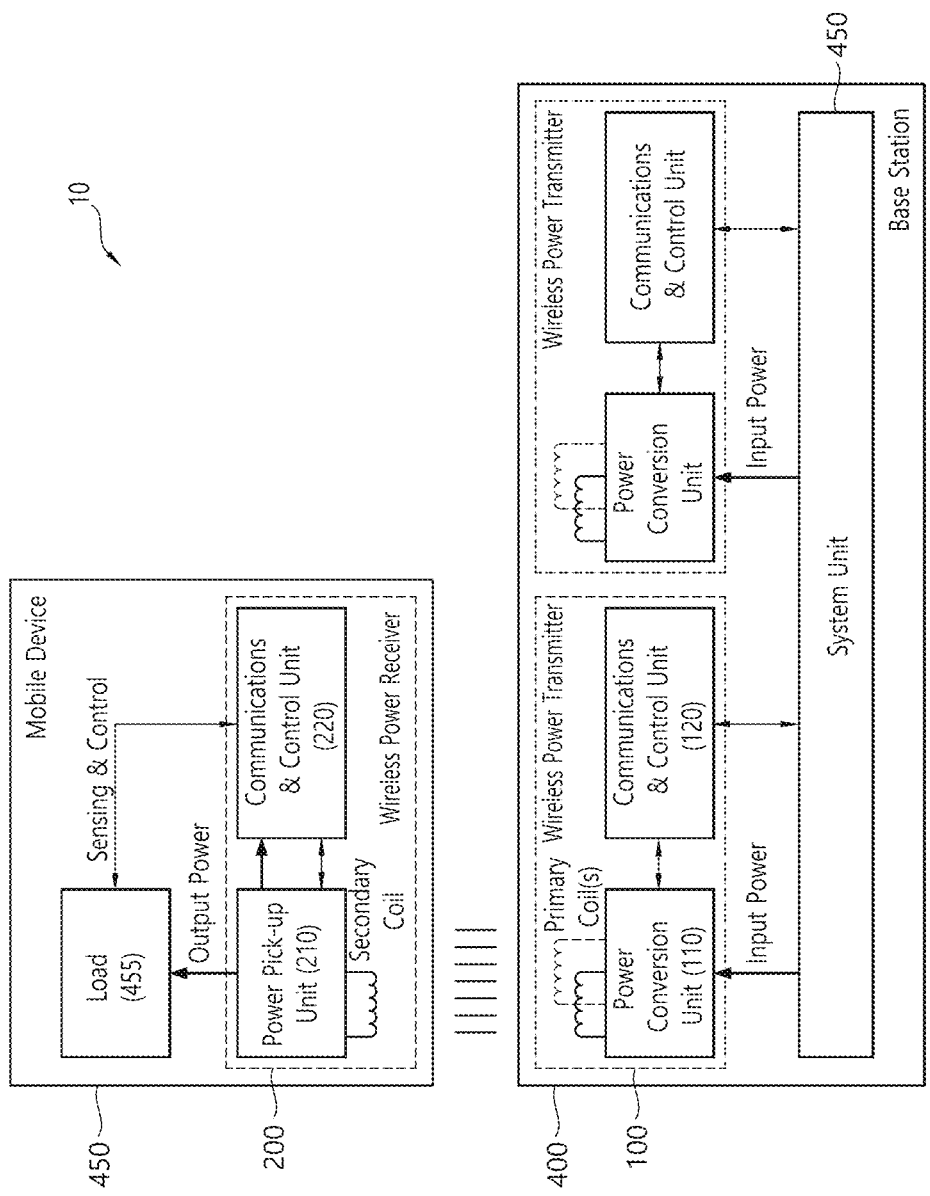
FIG. 4A is a block diagram of a wireless power transfer system according to another exemplary embodiment of the present disclosure.

FIG. 4a is a block diagram of a wireless power transfer system according to another exemplary embodiment of the present disclosure.

Referring to FIG. 4a, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting information on the magnetic wave through the primary coil or by receiving information on the magnetic wave through the primary coil. At this point, the communications & control unit (120) may load information in the magnetic wave or may interpret the information that is carried by the magnetic wave by using a modulation scheme, such as binary phase shift keying (BPSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4*a*, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Figure 4B:
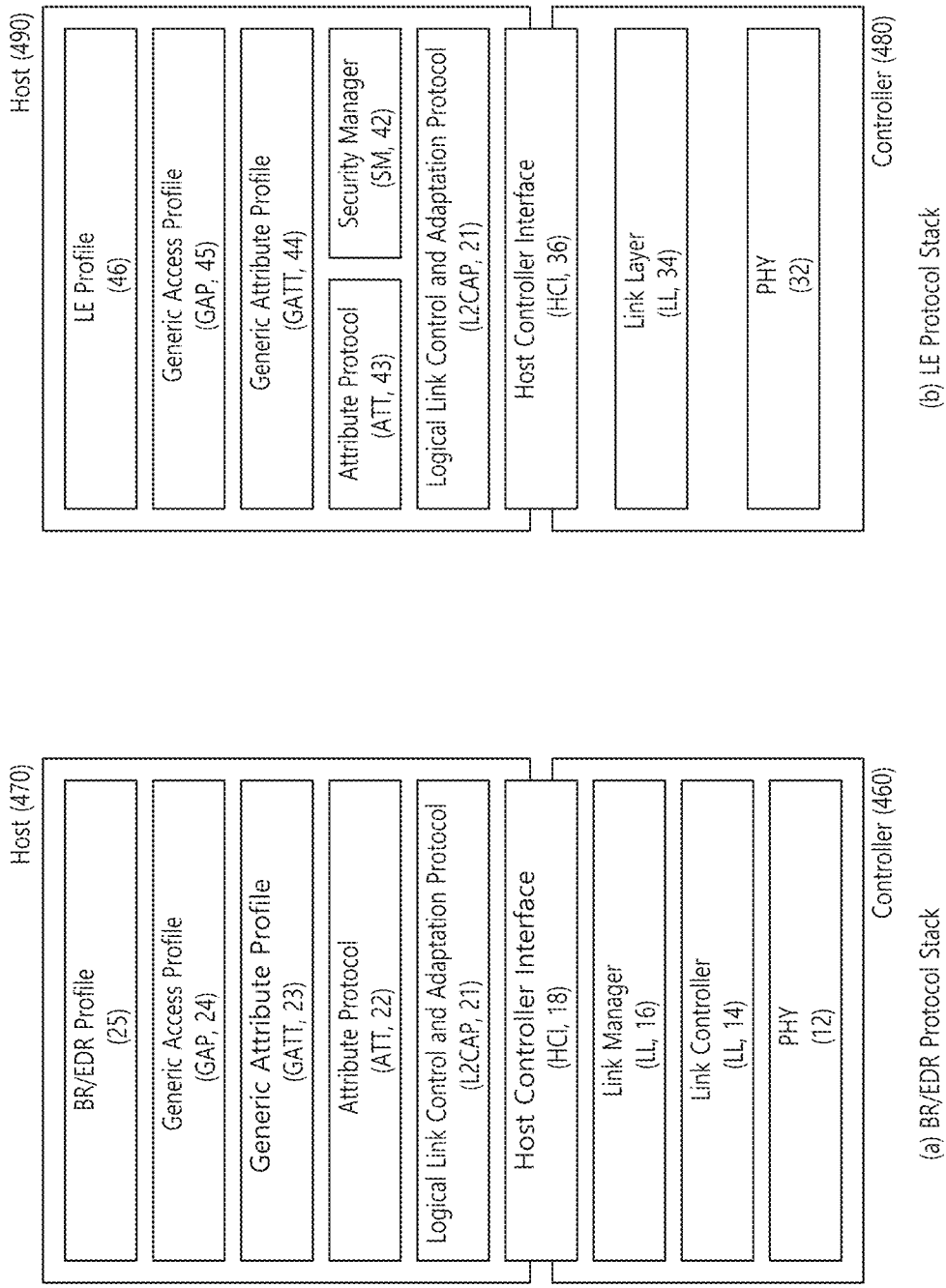
FIG. 4B is a diagram illustrating an example of a Bluetooth communication architecture to which an embodiment according to the present disclosure may be applied.

When the communication/control circuit 120 and the communication/control circuit 220 are Bluetooth or Bluetooth LE as an OB communication module or a short-range communication module, the communication/control circuit 120 and the communication/control circuit 220 may each be implemented and operated with a communication architecture as shown in FIG. 4B.

FIG. 4B is a diagram illustrating an example of a Bluetooth communication architecture to which an embodiment according to the present disclosure may be applied.

Referring to FIG. 4B, (a) of FIG. 4B shows an example of a protocol stack of Bluetooth basic rate (BR)/enhanced data rate (EDR) supporting GATT, and (b) shows an example of Bluetooth low energy (BLE) protocol stack.

Specifically, as shown in (a) of FIG. 4B, the Bluetooth BR/EDR protocol stack may include an upper control stack 460 and a lower host stack 470 based on a host controller interface (HCI) 18.

The host stack (or host module) 470 refers to hardware for transmitting or receiving a Bluetooth packet to or from a wireless transmission/reception module which receives a Bluetooth signal of 2.4 GHz, and the controller stack 460 is connected to the Bluetooth module to control the Bluetooth module and perform an operation.

The host stack 470 may include a BR/EDR PHY layer 12, a BR/EDR baseband layer 14, and a link manager layer 16.

The BR/EDR PHY layer 12 is a layer that transmits and receives a 2.4 GHz radio signal, and in the case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence for hopping 1400 times per second, and transmits a time slot with a length of 625 us for each channel.

The link manager layer 16 controls an overall operation (link setup, control, security) of Bluetooth connection by utilizing a link manager protocol (LMP).

The link manager layer 16 may perform the following functions.

Performs ACL/SCO logical transport, logical link setup, and control.
Detach: It interrupts connection and informs a counterpart device about a reason for the interruption.
Performs power control and role switch.
Performs security (authentication, pairing, encryption) function.

The host controller interface layer 18 provides an interface between a host module and a controller module so that a host provides commands and data to the controller and the controller provides events and data to the host.

The host stack (or host module, 470) includes a logical link control and adaptation protocol (L2CAP) 21, an attribute protocol 22, a generic attribute profile (GATT) 23, a generic access profile (GAP) 24, and a BR/EDR profile 25.

The logical link control and adaptation protocol (L2CAP) 21 may provide one bidirectional channel for transmitting data to a specific protocol or profile.

The L2CAP 21 may multiplex various protocols, profiles, etc., provided from upper Bluetooth.

L2CAP of Bluetooth BR/EDR uses dynamic channels, supports protocol service multiplexer, retransmission, streaming mode, and provides segmentation and reassembly, per-channel flow control, and error control.

The generic attribute profile (GATT) 23 may be operable as a protocol that describes how the attribute protocol 22 is used when services are configured. For example, the generic attribute profile 23 may be operable to specify how ATT attributes are grouped together into services and may be operable to describe features associated with services.

Accordingly, the generic attribute profile 23 and the attribute protocols (ATT) 22 may use features to describe device's state and services, how features are related to each other, and how they are used.

The attribute protocol 22 and the BR/EDR profile 25 define a service (profile) using Bluetooth BR/EDR and an application protocol for exchanging these data, and the generic access profile (GAP) 24 defines device discovery, connectivity, and security level.

As shown in (b) of FIG. 4B, the Bluetooth LE protocol stack includes a controller stack 480 operable to process a wireless device interface important in timing and a host stack 490 operable to process high level data.

First, the controller stack 480 may be implemented using a communication module that may include a Bluetooth wireless device, for example, a processor module that may include a processing device such as a microprocessor.

The host stack 490 may be implemented as a part of an OS running on a processor module or as an instantiation of a package on the OS.

In some cases, the controller stack and the host stack may be run or executed on the same processing device in a processor module.

The controller stack 480 includes a physical layer (PHY) 32, a link layer 34, and a host controller interface 36.

The physical layer (PHY, wireless transmission/reception module) 32 is a layer that transmits and receives a 2.4 GHz radio signal and uses Gaussian frequency shift keying (GFSK) modulation and a frequency hopping scheme including 40 RF channels.

The link layer 34, which serves to transmit or receive Bluetooth packets, creates connections between devices after performing advertising and scanning functions using 3 advertising channels and provides a function of exchanging data packets of up to 257 bytes through 37 data channels.

The host stack includes a generic access profile (GAP) 45, a logical link control and adaptation protocol (L2CAP, 41), a security manager (SM) 42, and an attribute protocol (ATT) 43, a generic attribute profile (GATT) 44, a generic access profile 45, and an LE profile 46. However, the host stack 490 is not limited thereto and may include various protocols and profiles.

The host stack multiplexes various protocols, profiles, etc., provided from upper Bluetooth using L2CAP.

First, the logical link control and adaptation protocol (L2CAP) 41 may provide one bidirectional channel for transmitting data to a specific protocol or profile.

The L2CAP 41 may be operable to multiplex data between higher layer protocols, segment and reassemble packages, and manage multicast data transmission.

In Bluetooth LE, three fixed channels (one for signaling CH, one for security manager, and one for attribute protocol) are basically used. Also, a dynamic channel may be used as needed.

Meanwhile, a basic channel/enhanced data rate (BR/EDR) uses a dynamic channel and supports protocol service multiplexer, retransmission, streaming mode, and the like.

The security manager (SM) 42 is a protocol for authenticating devices and providing key distribution.

The attribute protocol (ATT) 43 defines a rule for accessing data of a counterpart device in a server-client structure. The ATT has the following 6 message types (request, response, command, notification, indication, confirmation).

① Request and Response message: A request message is a message for requesting specific information from the client device to the server device, and the response message is a response message to the request message, which is a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

⑤ Battery: Battery information exchanging method

⑥ Time: Time information exchanging method

⑦ FindMe: Provision of alarm service according to distance

⑧ Proximity: Battery information exchanging method

⑨ Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an supplemental information request or a connection request.

In contrast, directed advertising may make an supplemental information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related supplemental information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in a Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 3 below.

TABLE 3

| Modulation level | Number of cycles per bit |
|---|---|
| 0 (default) | 256 |
| 1 | 128 |
| 2 | 64 |
| 3 | 32 |
| 4 | 16 |
| 5 | 8 |

Advertising PDU The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in the present disclosure.

Referring to FIG. 4a, the load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Figure 4C:
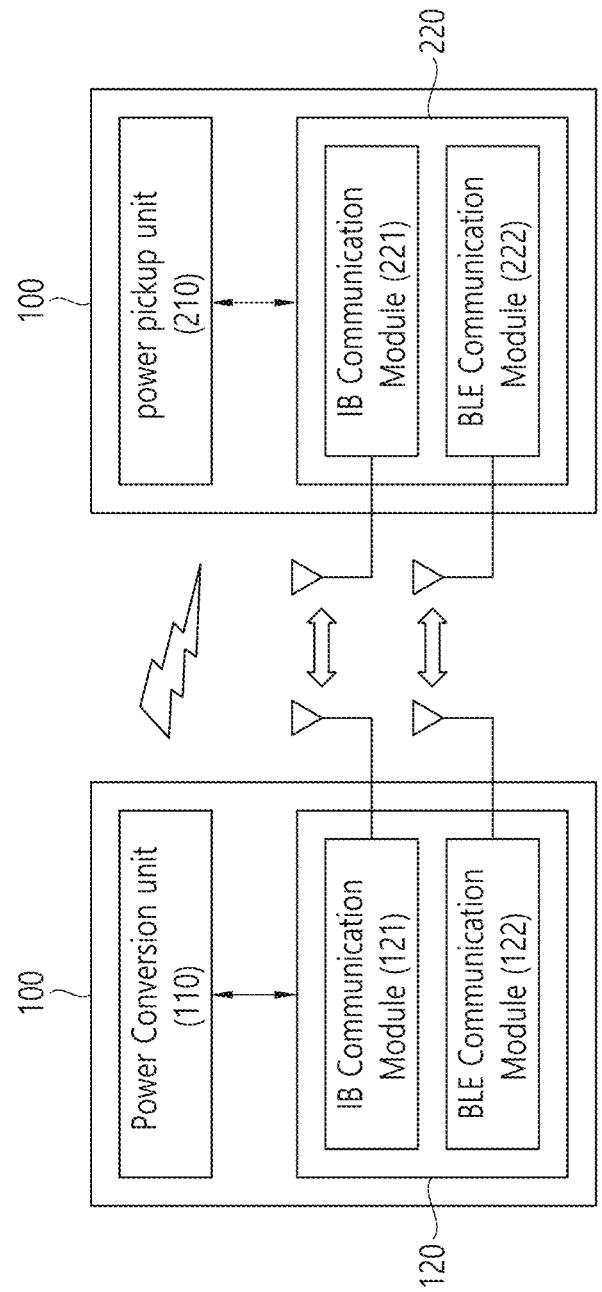
FIG. 4C is a block diagram illustrating a wireless power transfer system using BLE communication according to an example.

When the communication/control circuit 120 and the communication/control circuit 220 include Bluetooth or Bluetooth LE as an OB communication module or a short-range communication module in addition to the IB communication module, the wireless power transmitter 100 including the communication/control circuit 120 and the wireless power receiver 200 including the communication/control circuit 220 may be represented by a simplified block diagram as shown in FIG. 4C.

FIG. 4C is a block diagram illustrating a wireless power transfer system using BLE communication according to an example.

Referring to FIG. 4C, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122 and 222 perform the architecture and operation according to FIG. 4B. For example, the BLE communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using BLE transmission.

Figure 4D:
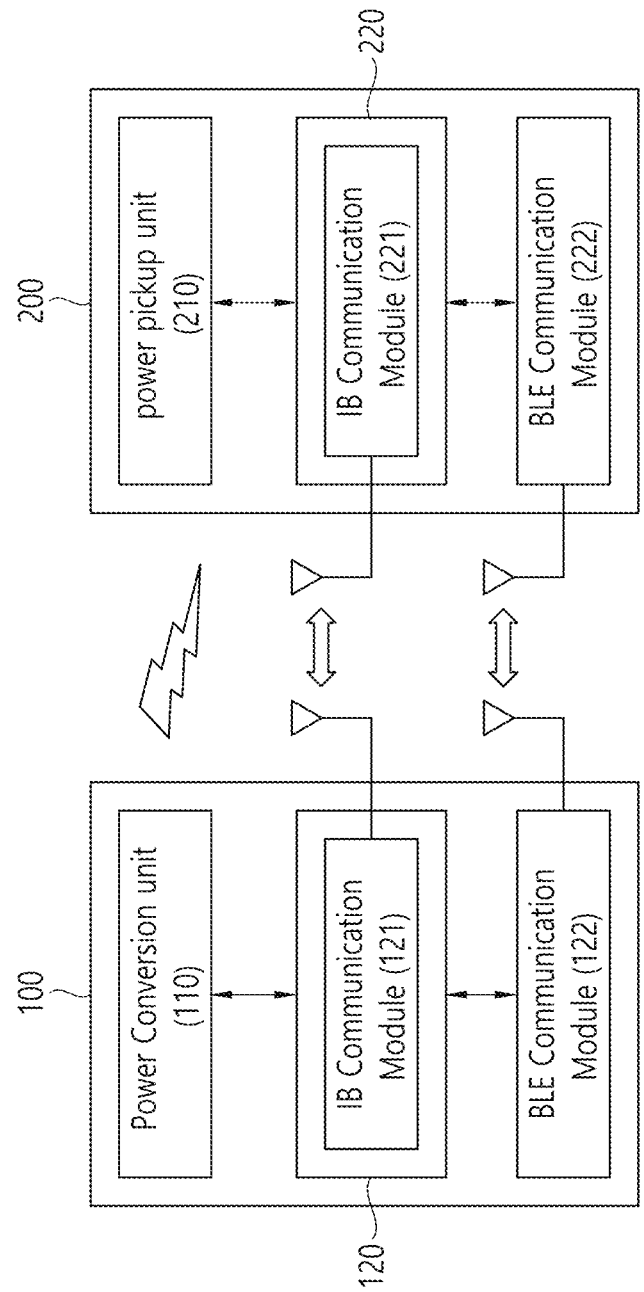
FIG. 4D is a block diagram illustrating a wireless power transfer system using BLE communication according to another example.

Referring to FIG. 4D, the communication/control circuits 120 and 220 respectively include only in-band communication modules 121 and 221, and the BLE communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

FIG. 5 is a state transition diagram for describing a wireless power transfer procedure.

Referring to FIG. 5, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal(or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 6:
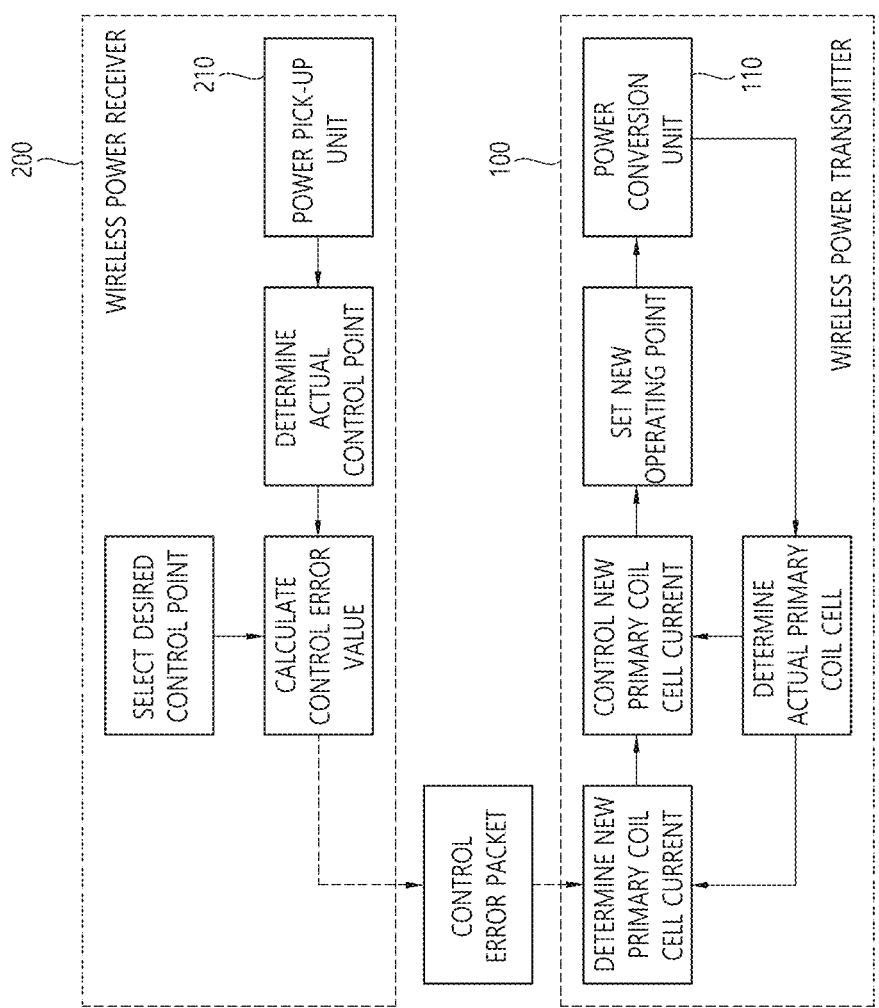
FIG. 6 shows a power control method according to an exemplary embodiment of the present disclosure.

FIG. 6 shows a power control method according to an exemplary embodiment of the present disclosure.

As shown in FIG. 6, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
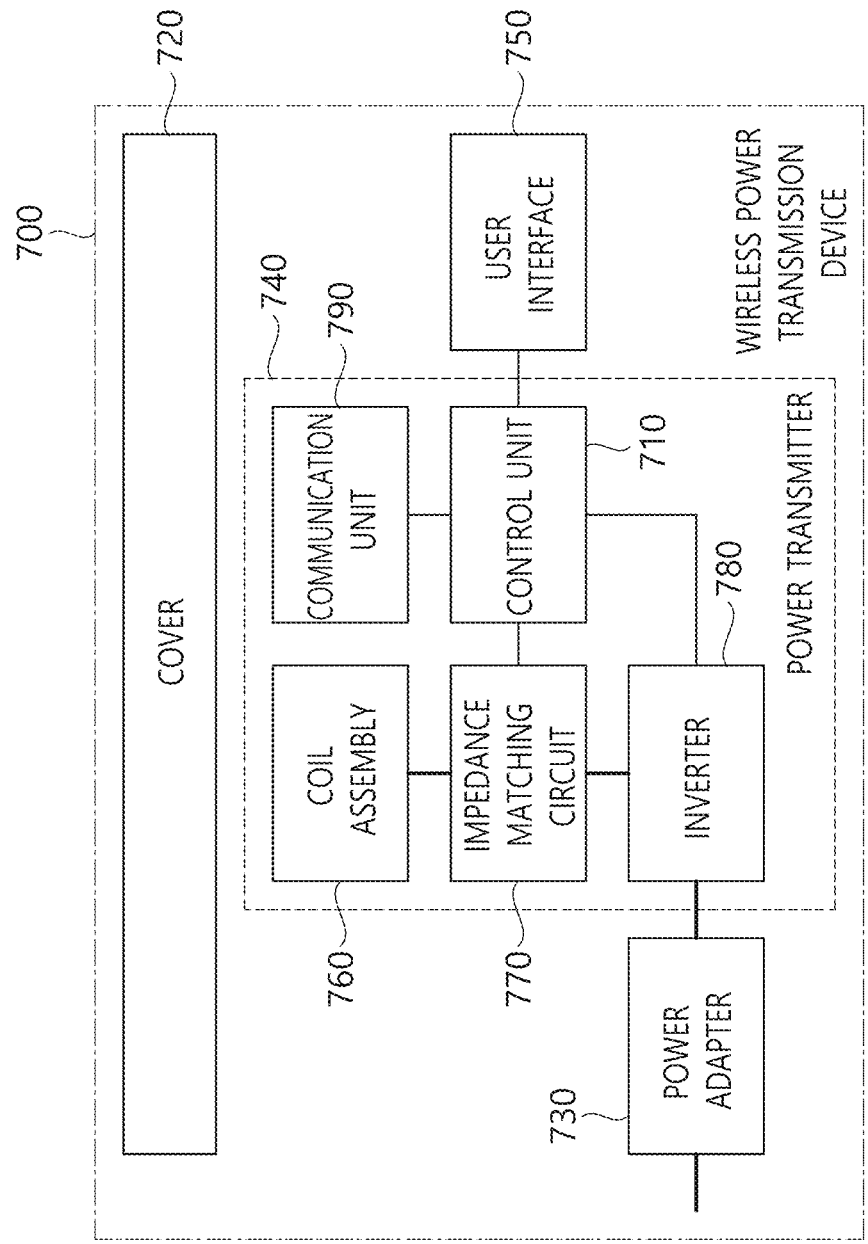
FIG. 7 is a block diagram of a wireless power transmitter according to another exemplary embodiment of the present disclosure.

FIG. 7 is a block diagram of a wireless power transmitter according to another exemplary embodiment of the present disclosure. This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 8:
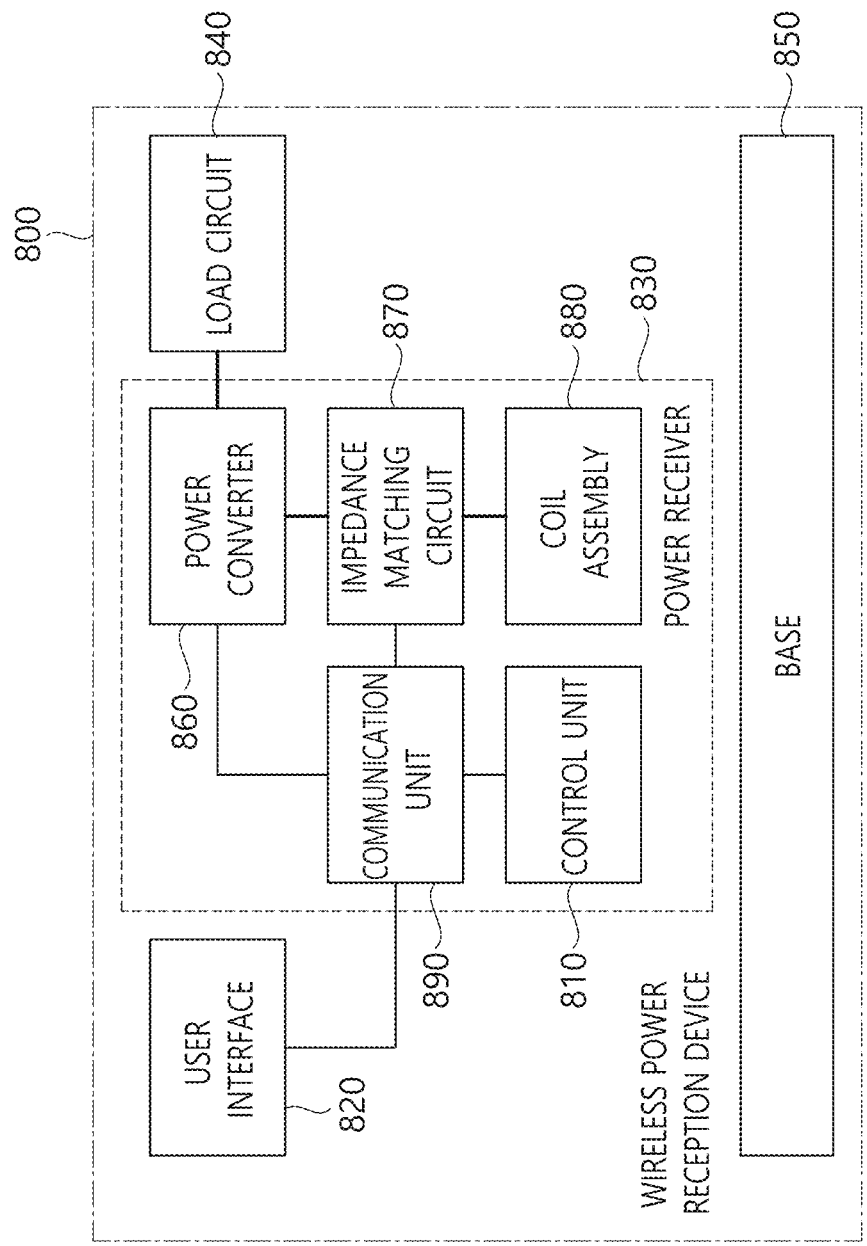
FIG. 8 shows a wireless power receiver according to another exemplary embodiment of the present disclosure.

FIG. 8 shows a wireless power receiver according to another exemplary embodiment of the present disclosure. This may belong to a wireless power transfer system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

Figure 9:
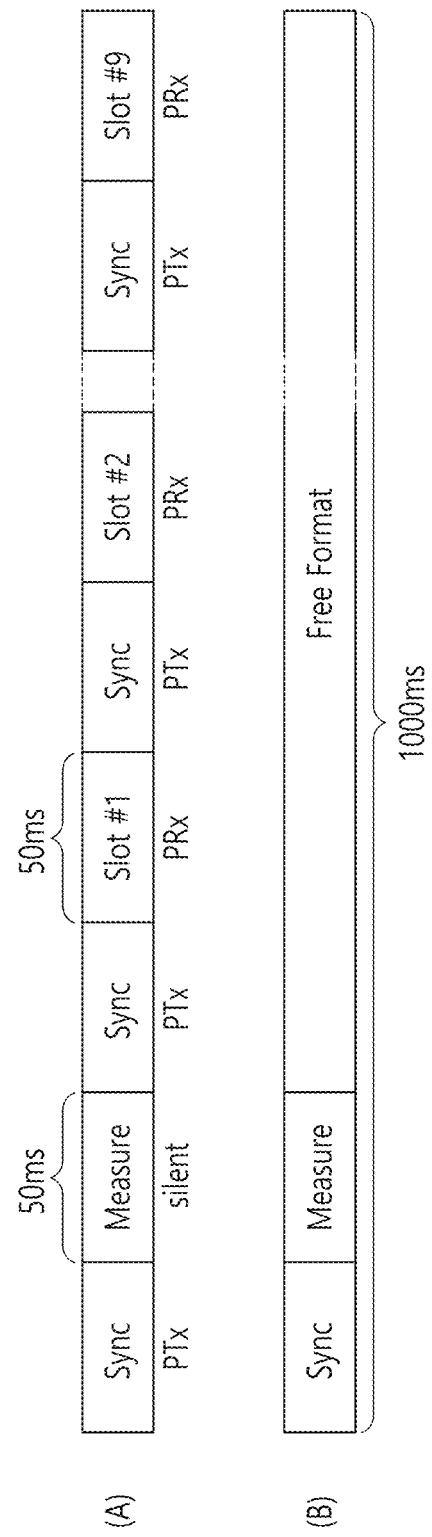
FIG. 9 shows a communication frame structure according to an exemplary embodiment of the present disclosure.

FIG. 9 shows a communication frame structure according to an exemplary embodiment of the present disclosure. This may correspond to a communication frame structure in a shared mode.

Referring to FIG. 9, in the shared mode, different forms of frames may be used along with one another. For example, in the shared mode, a slotted frame having a plurality of slots, as shown in (A), and a free format frame that does not have a specified format, as shown in (B), may be used. More specifically, the slotted frame corresponds to a frame for transmitting short data packets from the wireless power receiver (200) to the wireless power transmitter (100). And, since the free format frame is not configured of a plurality of slots, the free format frame may correspond to a frame that is capable of performing transmission of long data packets.

Meanwhile, the slotted frame and the free format frame may be referred to other diverse terms by anyone skilled in the art. For example, the slotted frame may be alternatively referred to as a channel frame, and the free format frame may be alternatively referred to as a mess age frame.

More specifically, the slotted frame may include a sync pattern indicating the starting point (or beginning) of a slot, a measurement slot, nine slots, and additional sync patterns each having the same time interval that precedes each of the nine slots.

Herein, the additional sync pattern corresponds to a sync pattern that is different from the sync pattern that indicates the starting point of the above-described frame. More specifically, the additional sync pattern does not indicate the starting point of the frame but may indicate information related to the neighboring (or adjacent) slots (i.e., two consecutive slots positioned on both sides of the sync pattern).

Among the nine slots, each sync pattern may be positioned between two consecutive slots. In this case, the sync pattern may provide information related to the two consecutive slots.

Additionally, the nine slots and the sync patterns being provided before each of the nine slots may have the same time interval. For example, the nine slots may have a time interval of 50 ms. And, the nine sync patterns may have a time length of 50 ms.

Meanwhile, the free format frame, as shown in (B) may not have a specific format apart from the sync pattern indicating the starting point of the frame and the measurement slot. More specifically, the free format frame is configured to perform a function that is different from that of the slotted frame. For example, the free format frame may be used to perform a function of performing communication of long data packets (e.g., additional owner information packets) between the wireless power transmitter and the wireless power receiver, or, in case of a wireless power transmitter being configured of multiple coils, to perform a function of selecting any one of the coils.

Hereinafter, a sync pattern that is included in each frame will be described in more detail with reference to the accompanying drawings.

FIG. 10 is a structure of a sync pattern according to an exemplary embodiment of the present disclosure.

Referring to FIG. 10, the sync pattern may be configured of a preamble, a start bit, a response field, a type field, an info field, and a parity bit. In FIG. 10, the start bit is illustrated as ZERO.

More specifically, the preamble is configured of consecutive bits, and all of the bits may be set to 0. In other words, the preamble may correspond to bits for matching a time length of the sync pattern.

The number of bits configuring the preamble may be subordinate to the operation frequency so that the length of the sync pattern may be most approximate to 50 ms but within a range that does not exceed 50 ms. For example, in case the operation frequency corresponds to 100 kHz, the sync pattern may be configured of two preamble bits, and, in case the operation frequency corresponds to 105 kHz, the sync pattern may be configured of three preamble bits.

The start bit may correspond to a bit that follows the preamble, and the start bit may indicate ZERO. The ZERO may correspond to a bit that indicates a type of the sync pattern. Herein, the type of sync patterns may include a frame sync including information that is related to a frame, and a slot sync including information of the slot. More specifically, the sync pattern may be positioned between consecutive frames and may correspond to a frame sync that indicate a start of the frame, or the sync pattern may be positioned between consecutive slots among a plurality of slots configuring the frame and may correspond to a sync slot including information related to the consecutive slots.

For example, in case the ZERO is equal to 0, this may indicate that the corresponding slot is a slot sync that is positioned in-between slots. And, in case the ZERO is equal to 1, this may indicate that the corresponding sync pattern is a frame sync being located in-between frames.

A parity bit corresponds to a last bit of the sync pattern, and the parity bit may indicate information on a number of bits configuring the data fields (i.e., the response field, the type field, and the info field) that are included in the sync pattern. For example, in case the number of bits configuring the data fields of the sync pattern corresponds to an even number, the parity bit may be set to when, and, otherwise (i.e., in case the number of bits corresponds to an odd number), the parity bit may be set to 0.

The response field may include response information of the wireless power transmitter for its communication with the wireless power receiver within a slot prior to the sync pattern. For example, in case a communication between the wireless power transmitter and the wireless power receiver is not detected, the response field may have a value of '00'. Additionally, if a communication error is detected in the communication between the wireless power transmitter and the wireless power receiver, the response field may have a value of '01'. The communication error corresponds to a case where two or more wireless power receivers attempt to access one slot, thereby causing collision to occur between the two or more wireless power receivers.

Additionally, the response field may include information indicating whether or not the data packet has been accurately received from the wireless power receiver. More specifically, in case the wireless power transmitter has denied the data packet, the response field may have a value of "10" (10—not acknowledge (NAK)). And, in case the wireless power transmitter has confirmed the data packet, the response field may have a value of "11" (11—acknowledge (ACK)).

The type field may indicate the type of the sync pattern. More specifically, in case the sync pattern corresponds to a first sync pattern of the frame (i.e., as the first sync pattern, in case the sync pattern is positioned before the measurement slot), the type field may have a value of '1', which indicates a frame sync.

Additionally, in a slotted frame, in case the sync pattern does not correspond to the first sync pattern of the frame, the type field may have a value of '0', which indicates a slot sync.

Moreover, the information field may determine the meaning of its value in accordance with the sync pattern type, which is indicated in the type field. For example, in case the type field is equal to 1 (i.e., in case the sync pattern type indicates a frame sync), the meaning of the information field may indicate the frame type. More specifically, the information field may indicate whether the current frame corresponds to a slotted frame or a free-format frame. For example, in case the information field is given a value of '00', this indicates that the current frame corresponds to a slotted frame. And, in case the information field is given a value of '01', this indicates that the current frame corresponds to a free-format frame.

Conversely, in case the type field is equal to 0 (i.e., in case the sync pattern type indicates a slot sync), the information field may indicate a state of a next slot, which is positioned after the sync pattern. More specifically, in case the next slot corresponds to a slot that is allocated (or assigned) to a specific wireless power receiver, the information field is given a value of '00'. In case the next slot corresponds to a slot that is locked, so as to be temporarily used by the specific wireless power receiver, the information field is given a value of '01'. Alternatively, in case the next slot corresponds to a slot that may be freely used by a random wireless power receiver, the information field is given a value of '10'.

In what follows, disclosed is a wireless power transmission system, a wireless power transmitter, and a wireless power receiver capable of supporting an extended application range from a high-output wireless power receiver down to a medium/low-power wireless power receiver and capable of improving efficiency of power transfer.

When a wireless power transmission system is integrated into a particular application field, wireless power may be provided to the devices of the corresponding application field by employing a separate wireless power transmitter suitable for power consumption of the corresponding application field. In this case, another space to keep the separate wireless power transmitter is required, which may lead to increase of costs. On the other hand, if a specific device of the corresponding application field is provided being integrated with a wireless power transmitter, the space otherwise occupied by the wireless power transmitter may be saved, and an effect of cost reduction may also be achieved. One example of efforts to obtain the advantages above in the field of kitchen appliances is to provide a high output wireless power transmitter in a way of being integrated into built-in type kitchen appliances such as an induction hob (IH) rather than being provided separately.

Accordingly, a method for integrating or adding a wireless power transmission system into kitchen appliances (particularly, built-in type appliances) such as an induction hob, a cooktop, or a hidden induction is currently under discussion, and this kind of approach is emerging as a real-world solution that expands wireless kitchen appliances. For example, an induction hob including a wireless power transmitter is not only capable of heating pots or pans according to their original intended use, but also capable of providing power wirelessly to other kitchen appliances (for example, a wireless electric rice cooker and a wireless electric pot) equipped with a wireless power receiver.

When a wireless power transmission system is applied to the field of kitchen appliances, some kitchen appliances may be configured to transmit wireless power while some kitchen appliances may be configured to receive wireless power. It is also possible that depending on the situations, some kitchen appliances may perform both transmission and reception of wireless power. In what follows, kitchen appliances performing transmission of wireless power are simply called a wireless power transmitter while those kitchen appliances performing reception of wireless power are simply called a wireless power receiver. However, it should be noted that since a wireless power transmitter or a wireless power receiver constitutes a part of a structure or a function of a specific kitchen appliance, it may be called simply by the name of the corresponding kitchen appliance. For example, an induction hob transmitting wireless power may be simply called an induction hob, and an electric rice cooker receiving wireless power from the induction hob may be simply called an electric rice cooker. However, from the point of view of a wireless power transmission system, the induction hob is treated as a wireless power transmitter, and the electric rice cooker is treated as a wireless power receiver.

Although the present disclosure uses kitchen appliances as an application field for which high output wireless power is required, a high output wireless power transmission system disclosed in the present disclosure may also be applied or integrated to various other application fields such as medical devices, electric vehicles, robots, industrial devices, military equipment, trains, facilities, aviation/aerospace applications, furniture, service infrastructure, and display devices in addition to kitchen appliances.

An induction hob transmitting wireless power according to the present embodiment is allowed to have only one coil. In other words, the same coil may be used for heating other kitchen appliances or used for transmission of wireless power. As described above, an integrated form in which a heating coil and a primary coil for power transmission are not separated is referred to as an integrated Tx coil or a single Tx coil. An integrated Tx coil may be a segmented type or a non-segmented type. The present embodiment is described based on one non-segmented type.

The mode in which an integrated transmitting coil is used for heating is referred to as a heating mode while the mode in which the integrated transmitting coil is used for power transmission is referred to as a power transmission mode. In other words, in the heating mode, an induction hob performs heating of other kitchen appliances by using the integrated transmitting coil while, in the power transmission mode, the induction hob transmits wireless power to other kitchen appliances by using the integrated transmitting coil. From the point of view of a wireless power transmission system, a wireless power transmitter performs heating of other devices by using the integrated transmitting coil and transmits wireless power to other wireless power receivers by using the integrated transmitting coil in the power transmission mode.

As described above, a wireless power transmitter may operate by switching to one of the two modes depending on the type of an object placed thereon. For example, an object detected by the wireless power transmitter is determined as a wireless power receiver, the wireless power transmitter is set to the power transmission mode to transmit wireless power to the wireless power receiver. On the other hand, if an object detected by the wireless power transmitter is determined as an object requiring heating rather than a wireless power receiver, the wireless power transmitter may operate in the heating mode to perform heating of the corresponding object.

The wireless power transmitter may have to undergo a trade-off to support both the two modes by using one integrated transmitting coil. For example, a structure of a wireless power transmitter or a wireless power receiver exhibiting good performance in one mode may instead reveal degradation of efficiency in the other mode. Therefore, an optimal design of the wireless power transmission system is required to guarantee excellent efficiency and high density power transmission in either mode.

WPC standards divides wireless power receivers into several classes (class A (~200 W, ϕ=8~13 cm), class B (~1200 W, ϕ=13~18 cm), class C (~2400 W, =18~24 cm)) depending on the magnitude of power consumption and the size of a secondary coil, and this way of classification rather limits design of an optimal wireless power transmission system. This is so because, depending on a design method of the integrated transmitting coil and the secondary coil, much larger power may be supplied to a wireless power receiver with a smaller secondary coil. For example, under a condition that the distance between the integrated transmitting coil and the secondary coil (coil-to-coil distance) is 15 mm, one embodiment of the present disclosure discloses an optimal design structure of a wireless power receiver or a new class satisfying requirements such that power up to 1500 W is received, diameter ϕ of the second coil ranges from 13 to 16 cm, and efficiency oat least 90% is achieved. Such a wireless power receiver may belong to class C in terms of magnitude of power but may belong to class B in terms of size of the secondary coil.

The wireless power receiver 200 of FIG. 4A may be a wireless power receiver disclosed below. And the wireless power transmitter 100 of FIG. 4A may be a wireless power transmitter disclosed below.

Figure 11:
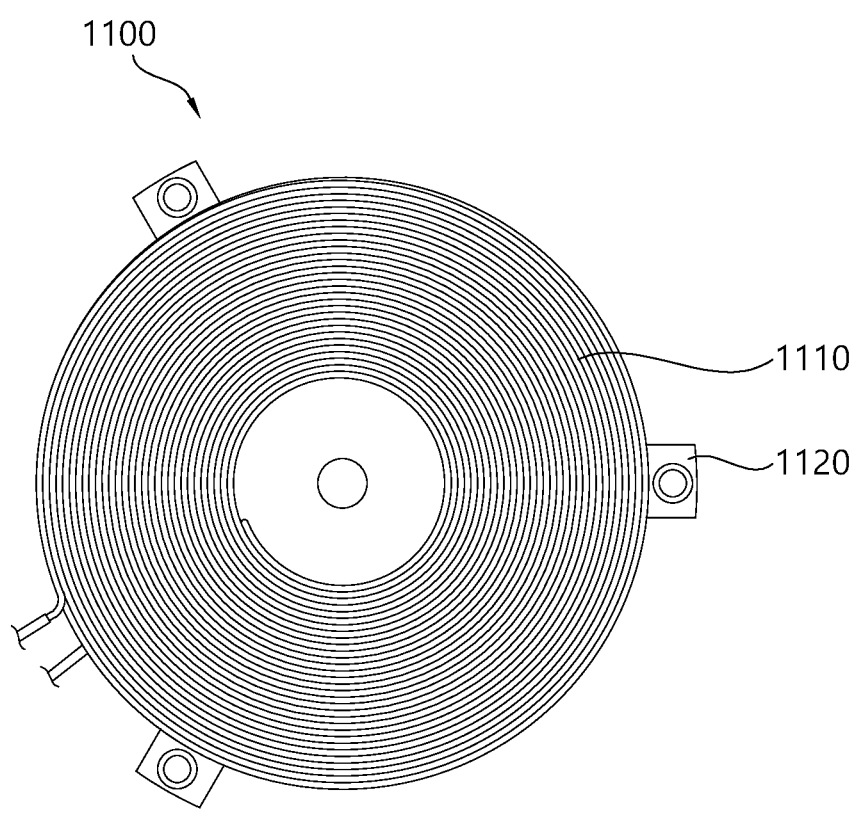
FIG. 11 illustrates an integrated transmitting coil and a shielding member of a wireless power transmitter according to one embodiment.

FIG. 11 illustrates an integrated transmitting coil and a shielding member of a wireless power transmitter according to one embodiment.

Referring to FIG. 11, a wireless power transmitter 1100 includes an integrated transmitting coil 1110 and a shielding member 1120.

The integrated transmitting coil 1110 is wound in a planar spiral pattern and disposed on one surface of the shielding member 1120. Litz coil may be used as the integrated transmitting coil 1110. The winding pattern of the integrated transmitting coil may use a planar spiral pattern but may not be limited to the specific pattern, which may take various patterns including a rectangular shape, an elliptical shape, and a triangular shape. Also, for the integrated transmitting coil, one copper wire may be used instead of the Litz coil. Although not shown in the figure, the integrated transmitting coil 1110 may be connected to an inverter. At this time, the inverter may correspond to the power conversion unit 110 of FIG. 4A.

To derive a design of an optimal integrated transmitting coil and secondary coil according to the present embodiment, the following design goals (or requirements) are assumed.

1) A wireless power transmitter includes a single non-segmented type integrated transmitting coil.

2) The diameter ϕ of a secondary coil ranges from 13 to 16 cm.

3) Distance between the integrated transmitting coil and the secondary coil (coil-to-coil distance) is 15 mm.

4) A wireless power receiver should be able to receive power up to 1500 W±10%.

5) System efficiency of at least 90% is satisfied.

6) An existing induction hob design is retained.

The design goals and requirements above correspond to the minimum physical/electric design requirements of a wireless power transmission system that meets an actual design and use of kitchen appliances. Such a wireless power receiver may belong to class C in terms of magnitude of power but may belong to class B in terms of size of the secondary coil. In other words, a wireless power receiver satisfying the design goals above may be defined to belong to a new class between class B and class C.

First, the following show electromagnetic design parameters of a wireless power transmission system, a wireless power transmitter, and a wireless power receiver, which may be considered for implementation of the requirements above.

1) Electromagnetic design parameter of a wireless power transmission system

Magnetic coupling coefficient K of an integrated transmitting coil

2) Electromagnetic design parameter of a wireless power transmitter

Topology of an inverter

Inductance Lp of the integrated transmitting coil

Operating frequency (OP) fop

Maximum transmission power Ptmax

Current flowing through the integrated transmitting coil Ipmax

Ucmax

3) Electromagnetic design parameter of a wireless power receiver

Multiplication of a current and inductance of a secondary coil ($I_{load}$*Ls)

Operating voltage $U_{load}$ of the wireless power receiver

Inductance Ls of the secondary coil

Reception power $P_L$

Load voltage $U_L$

Inventors of the present disclosure have carried out an experiment by applying various combinations of electromagnetic design parameters of the wireless power transmission system, wireless power transmitter, and wireless power receiver; and as a result, derived optimal electromagnetic design parameters that meet the requirements of a new class as follows.

1) Design parameters of a wireless power transmission system according to the present embodiment Magnetic coupling coefficient K of the integrated transmitting coil: K is 0.65 when the wireless power transmitter 1100 is used for an induction hob.

2) Design parameters of a wireless power transmitter according to the present embodiment Topology of an inverter=half-bridge topology Inductance Lp of the integrated transmitting coil=44-45 μH Operating frequency (OP) fop=20-50 KHz Maximum transmission power Ptmax<2000 W (avg)

Current flowing through the integrated transmitting coil Ipmax<30 A (rms)

Ucmax<1000V (pk-pk)

3) Design parameters of a wireless power receiver according to the present embodiment Multiplication of a current and inductance of the secondary coil ($I_{load}$*Ls) should be minimized. The size and costs of an application product receiving wireless power should be minimized Operating voltage of the wireless power receiver $U_{load}$=220-230V (rms)

Inductance Ls of the secondary coil=90 μH

Reception power $P_L$=1500 W±10%

Load voltage $U_L$=220V or 230V (rms)

Figure 12:
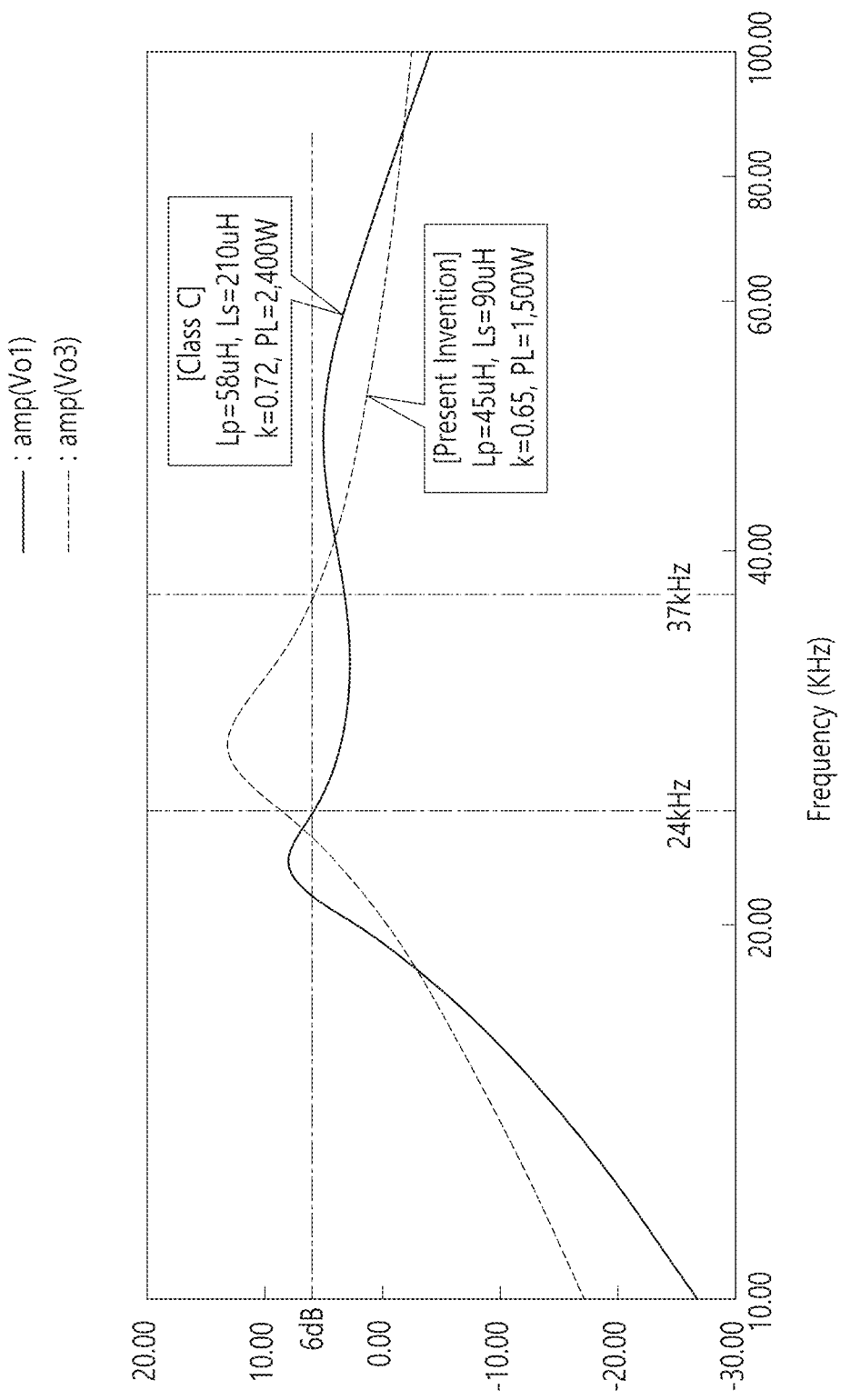
FIG. 12 is a graph comparing efficiency at different operating frequencies between electromagnetic design parameters according to one embodiment and electromagnetic design parameters of class C.

In the experiment, efficiency according to operating frequencies was measured based on the electromagnetic design parameters for a new class, and a result as shown in FIG. 12 was obtained.

FIG. 12 is a graph comparing efficiency at different operating frequencies between electromagnetic design parameters according to one embodiment and electromagnetic design parameters of class C.

Referring to FIG. 12, if a wireless power receiver according to the electromagnetic design parameters derived from the embodiment above and a wireless power receiver according to class C are compared with each other, the wireless power receiver according to the embodiment above exhibits better efficiency in the operating frequency fop range of 24 KHz to 37 KHz. However, it is observed that as inductance Ls of the secondary coil becomes larger, a resonance split is occurred over the class C segment exhibiting power larger than 1.5 kw, and control becomes unstable.

For reference, electromagnetic design parameters of a wireless power transmission system according to the class C, which is a comparison group, are as follows.

1) Design parameters of a wireless power transmission system according to class C
Magnetic coupling coefficient K of the integrated transmitting coil: K is 0.72 when the wireless power transmitter 1100 is used for an induction hob.

2) Design parameters of a wireless power transmitter according to the present embodiment
Topology of an inverter=half-bridge topology
Inductance Lp of the integrated transmitting coil=58 μH
Operating frequency (OP) fop=20-50 KHz
Maximum transmission power Ptmax>2700 W (avg)
Current flowing through the integrated transmitting coil Ipmax>30 A (rms)
Ucmax>500V (pk-pk)

3) Design parameters of a wireless power receiver according to the present embodiment
Multiplication of a current and inductance of the secondary coil ($I_{load}$*Ls) should be minimized. The size and costs of an application product receiving wireless power should be minimized
Operating voltage of the wireless power receiver $U_{load}$=230V (rms)
Inductance Ls of the secondary coil=210 μH
Reception power $P_L$=2400 W
Load voltage $U_L$=230V (rms)

Therefore, the present embodiment includes a method that designs inductance Ls of the secondary coil to be relatively low and operating frequency fop to be relatively high to implement a stable ZVC operation.

The table of FIG. 13 summarizes electromagnetic design parameters of a wireless power transmission system according to the present embodiment.

In the case of a kitchen appliance such as an induction hob, the size of a typical integrated transmitting coil is smaller than or equal to 15 cm. If positional tolerance of the secondary coil is defined to be ±5 cm and is to be guaranteed, the integrated transmitting coil of the induction hob has to be redesigned, otherwise it may be difficult to be applied to small kitchen appliances equipped with a secondary coil. Here, positional error refers to an alignment error between the integrated transmitting coil and the secondary coil, and the positional tolerance refers to the maximum allowable alignment error in a specific system. The positional tolerance may be set to have various values according to the application field or design goals of the wireless power transmission system.

The present embodiment discloses a method that specifies the positional tolerance as a ratio to the size of the integrated transmitting coil and designs a wireless power transmission system based on the positional tolerance. For example, the positional tolerance may be defined to be within 5% of the size of the integrated transmitting coil, and the wireless power transmission system may be designed to satisfy the positional tolerance. In this case, since the positional tolerance of the secondary coil is specified as a ratio rather than an absolute size like ±5 cm, various small-size kitchen appliances may be designed by using a ratio of the integrated transmitting coil and the secondary coil without having to consider each of the kitchen appliances separately, and thereby system design becomes relatively simple and at the same time, more precise.

In the description above, electromagnetic design parameters for a new class have been disclosed; in the following, structural or physical design parameters of a wireless power transmission device for a new class will be disclosed.

As one example, to secure temperature performance according to continuous operation of an electric pot, one of kitchen appliances, physical parameters of the integrated transmitting coil related to an induction hob driven at 2 kW may be designed as shown in Table 4.

TABLE 4

| | |
|---|---|
| Maximum output [kW] | 1.8 |
| Rated output [kW] | 1.2 |
| Number of turns | 17 |
| Outer diameter of coil | 6 inch |
| Wire diameter [mm]/number of strands | Φ0.2/100 |
| Ferrite bar (WDH, mm) | 15 × 60 × 5(6 ea) |
| Resonance Cap. [uF] | 0.39 × 2 ea |

As another example, to secure temperature performance according to continuous operation of an electric pot, one of kitchen appliances, physical parameters of the integrated transmitting coil related to an induction hob driven at 2.2 kW may be designed as shown in Table 5.

TABLE 5

| | |
|---|---|
| Maximum output [kW] | 2.2 |
| Rated output [kW] | 1.4 |
| Number of turns | 19 |
| Outer diameter of coil | 6 inch |
| Wire diameter [mm]/number of strands | Φ0.18/100(Φ0.2/80) |
| Ferrite bar (WDH, mm) | 15 × 60 × 5(8 ea) |
| Resonance Cap. [uF] | 0.39 × 2 ea |

Figure 14:
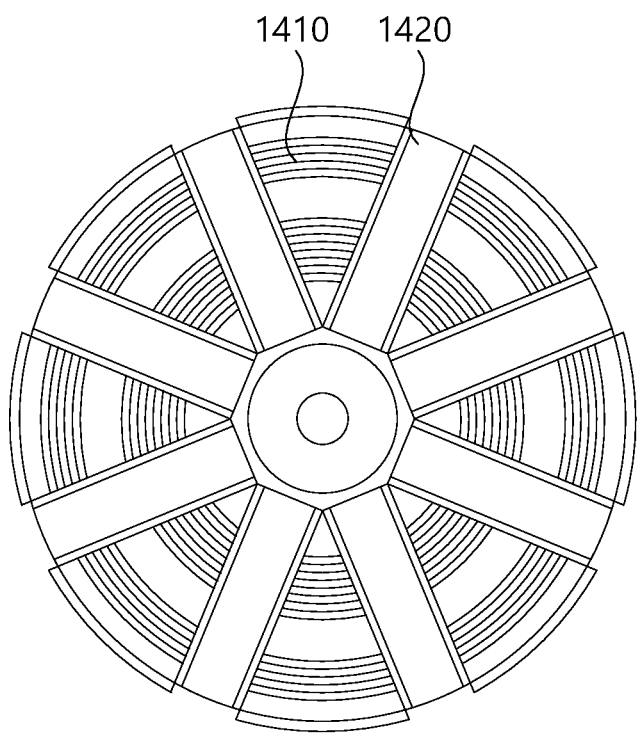
FIG. 14 illustrates an integrated transmitting coil fabricated using physical design parameters according to Table 5.

FIG. 14 shows an integrated transmitting coil fabricated by using the physical design parameters according to Table 5.

Referring to FIG. 14, a plurality of ferrite bars 1420 may be disposed on one surface of the integrated transmitting coil 1410. A ferrite bar may also be called a ferrite leg. In particular, each of a plurality of ferrite bars are disposed in a direction extending from the center of the integrated transmitting coil toward the outer peripheral surface, where the ferrite bars are disposed cyclically at predetermined angular intervals. In the wireless power transmitter 1100 according to the present embodiment, an adhesive portion may be interposed between the integrated transmitting coil 1110 and the shielding member 1120 so that the integrated transmitting coil 1110 and the shielding member 1120 may be fixed firmly to each other. In addition to the rectangular shape shown in FIG. 14, the ferrite bar may be fabricated in various other shapes depending on the application field, such as an elliptical shape.

In what follows, structural or physical design parameters of a wireless power receiver for a new class according to one embodiment are disclosed. The following are physical/electric features required for a secondary coil assembly according to the present embodiment to have high density power reception and high efficiency power transmission features and consideration points.

First, a design method for a secondary coil capable of receiving high power through a small secondary coil area is required in order for the secondary coil to be applied not only to medium power/high power home appliances but also to small output/small size home appliances.

Second, there needs a design method for an integrated transmitting coil and a secondary coil capable of keeping the magnitude of a resonance current flowing through the secondary coil to be small.

Third, there needs a design method for a secondary coil capable of maintaining stable output by improving transmission efficiency and reducing heat generation of a secondary coil assembly (generally, heat generated in coil reduces output).

Fourth, there needs a design method for a secondary coil capable of maintaining the minimum efficiency even in the case of eccentricity (a situation where a transmission and reception coils are out of alignment or a position error exists between them).

One embodiment to satisfy the design requirements above includes a secondary coil assembly capable of improving transmission efficiency and energy transmission density and capable of transmitting wireless power in a stable manner in the case of eccentricity, even when the integrated transmitting coil consists of a single coil with a limited transmission area and the secondary coil also occupies a small area, the diameter of which is less than about 140 mm As there are various types of small home appliances including a wireless power receiver, sizes of bottom surfaces on which the secondary coil may be installed are also various. However, a reception coil of a wireless power receiver receiving high output power (i.e., more than 1.2 kW) is usually designed to have the outer diameter to be larger than about 140 mm.

As described above, home appliances with high output specifications are designed to belong to one of various classes according to the size of their output and/or size of the secondary coil.

When the size of the integrated transmitting coil is 21 cm, the sizes of outer diameters of secondary coils to provide outputs of 36 types of home appliances may be divided into class A, B, and C. Each class is a group of home appliances showing similar correlation between the outer diameter of a secondary coil and the output of the corresponding home appliance. In general, the larger the output of a home appliance, the larger the outer diameter of a secondary coil that the corresponding home appliance has to accommodate. However, some home appliances do not follow a standard correlation pattern found between the outer diameter of a secondary coil and output of the corresponding home appliance. For example, among those homes appliances whose output belongs to class C, there are cases where the outer diameter of the secondary coil falls within the range corresponding to class B. Therefore, there needs a design method that satisfies both the conditions for the output of such a home appliance and outer diameter of its secondary coil.

According to one embodiment, provided is a secondary coil assembly providing wireless power transmission up to 2 kW based on secondary coils belonging to the class B segment with an outer diameter of 140 mm A small-sized secondary coil allows a compact design of wireless small home appliances, thereby providing advantages of allowing an aesthetic design and reducing weight. Therefore, the present embodiment designs a secondary coil assembly providing wireless power transmission up to 2 kW based on an outer diameter of 140 mm, which corresponds to the smallest secondary coil in the class B segment.

According to another embodiment, a secondary coil assembly designed based on the size of a resonance current of a wireless power transmitter is provided. When the temperature of the integrated transmitting coil of the wireless power transmitter is increased, output of the wireless power transmitter is decreased, where, in this case, it becomes difficult to secure performance for small-sized home appliances. Therefore, in order for a product requiring continuous operation to operate in a stable manner, sufficient operating time has to be secured, and to this purpose, it is necessary to minimize the resonance current of the integrated transmitting coil.

According to yet another embodiment, a secondary coil assembly designed in terms of efficiency in the case of true centering and eccentricity is provided. When a user places a small wireless device on the integrated transmitting coil, proper alignment may not be guaranteed, and eccentricity may occur for some cases. However, eccentricity causes reduction of efficiency/output. Therefore, the present embodiment designs a secondary coil assembly to provide sufficient efficiency for the operation of a wireless device even in the case of eccentricity so that the performances of small-sized wireless devices are kept constant.

Figure 15:
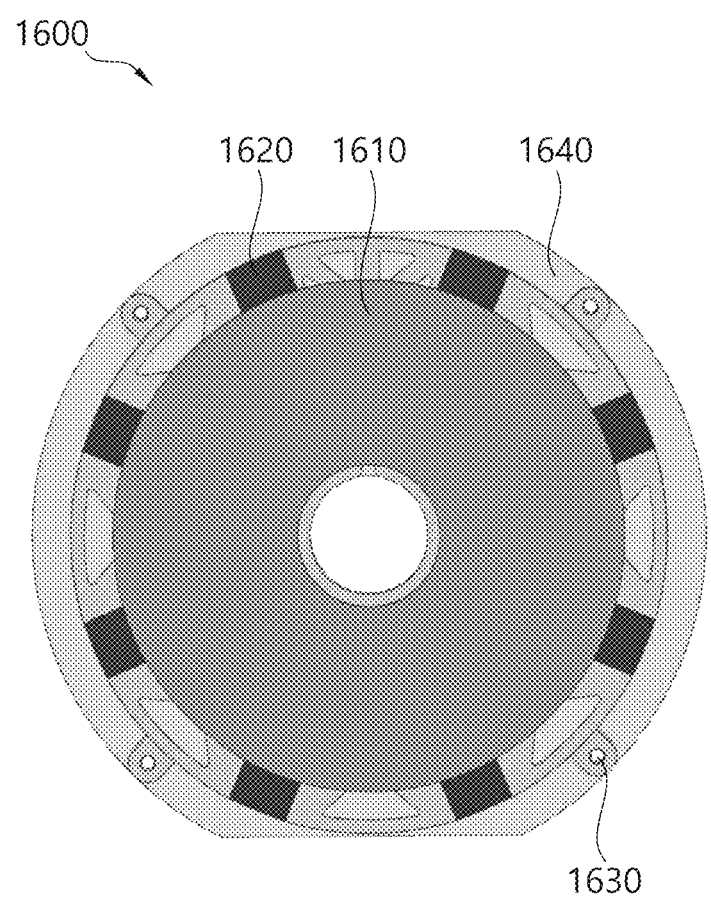
FIG. 15 is a conceptual drawing illustrating a structure of a second coil assembly according to one embodiment.

FIG. 15 is a conceptual drawing illustrating a structure of a second coil assembly according to one embodiment.

Referring to FIG. 15, a secondary coil assembly 1600 includes a secondary coil 1610 comprising a Litz coil, a ferrite bar 1620, a mold portion 1630 supporting the secondary coil 1610 and the ferrite bar 1620, and a shielding member 1640 (for example, Al base). The secondary coil 1610 is wound in a planar spiral pattern and disposed on one surface of the shielding member 1640. The winding pattern of the secondary coil 1610 may use a planar spiral pattern but may not be limited to the specific pattern, which may take various patterns including a rectangular shape, an elliptical shape, and a triangular shape. Also, for the secondary coil 1610, one copper wire may be used instead of the Litz coil.

Figure 16:
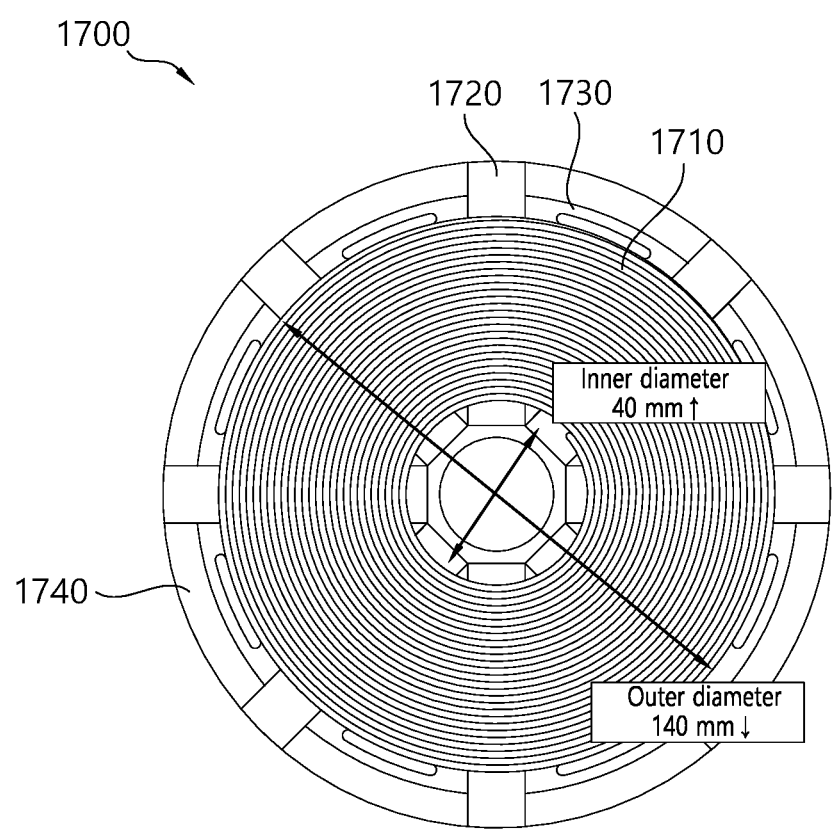
FIG. 16 illustrates a structure of a secondary coil assembly used in an actual experiment according to one embodiment.

FIG. 16 illustrates a structure of a secondary coil assembly used in an actual experiment according to one embodiment.

Referring to FIG. 16, a secondary coil assembly 1700 includes a secondary coil 1710 comprising a Litz coil, a ferrite bar 1720, a mold portion 1730 supporting the secondary coil 1710 and the ferrite bar 1720, and a shielding member 1740 (for example, Al base).

As an example, the outer diameter of the secondary coil 1710 is smaller than 140 mm, and the inner diameter thereof may be larger than 40 mm As another example, the number of turns of the secondary coil 1710 may be at least 20 turns.

As yet another example, the secondary coil assembly 1700 may be equipped with a plurality of ferrite bars 1720, the number of which may be at least 7. Here, the length of the ferrite bar 1720 may be at least 60 mm. Also, the ferrite bar 1720 may have a length extending to the outside of the outer diameter of the secondary coil 1710.

As still another example, the secondary coil assembly 1700 may be designed so that the magnitude of a resonance current in the integrated transmitted coil is less than 30 A(rms).

As yet still another example, inductance of the secondary coil assembly 1700, being measured including the Al base, may be larger than 100 μH.

As still yet another example, the area of the ferrite bar 1720 or the magnetic circuit may be designed to be at least 6300 mm².

In what follows, disclosed is an experiment carried out to demonstrate that it is preferable to design the secondary coil assembly according to the electric/physical design parameters of FIG. 16 in order for the secondary coil assembly to have high density/high efficiency power characteristics.

The goal of the present experiment is to design a secondary coil assembly such that lower specification limit (LSL) of efficiency in the case of eccentricity is 85% and the upper specification limit (USL) of a resonance current of the integrated transmitting coil is 30 A(rms) in the case of eccentricity.

Regarding the lower specification limit of efficiency, based on the condition that z and standard deviation (a) of a normal distribution are 4.5 and 0.42842, respectively, target efficiency is obtained as $z*\sigma + LSL = 4.5*0.42842 + 85 = 86.92\%$.

Regarding the upper specification limit of a resonance current of the integrated transmitting coil, based on the condition that z and standard deviation (a) of a normal distribution are 4.5 and 0.48233, respectively, a target resonance current is obtained as $USL - z*\sigma = 30 - 4.5*0.48233 = 27.83$ A(rms).

First, to design a secondary coil assembly satisfying efficiency of 85% specified under the true centering condition, an experiment for determining an optimal number of turns of a secondary coil is conducted. As one example, an optimal number of secondary coil turns may be determined by analyzing correlation between the number of turns and efficiency of the coil. The number of ferrite bars used in the present experiment is 6.

FIG. 17 shows variations of a resonance current and efficiency of an integrated transmitting coil due to the number of turns of secondary coils according to one example.

Referring to FIG. 17, (a) illustrates a case where the number of turns of a secondary coil is 20, and (b) illustrates a case where the number of turns of a secondary coil is 15. When the number of turns of the secondary coil is 20 and 15, the resonance current flowing through the integrated transmitting coil is 32.3 A(rms) and 37.5 A(rms); and the resonance current flowing through the secondary coil is 11.36 A(rms) and 9.82 A(rms), respectively.

According to the present experiment, the minimum number of turns of a secondary coil to satisfy the minimum efficiency of 85% is 20. In other words, it is preferable that the number of turns of the secondary coil is larger than 20. Therefore, it may be known that the number of turns of the secondary coil to achieve target efficiency of 87% should be at least larger than the minimum number of turns, 20, which satisfies the minimum efficiency of 85%.

To determine the number of turns of the secondary coil providing target efficiency of 87%, parameters of the integrated transmitting coil and the secondary coil are measured (by using an LCR meter), and from the measurement, it is confirmed that a preferable number of turns for the secondary coil is 28 as shown in FIG. 18.

Next, electric/physical parameters of the secondary coil assembly satisfying target efficiency of 87% under the eccentricity condition are designed. The number of turns for the secondary coil is chosen as 28, which is the number of turns determined in FIG. 18, but efficiency is measured from various sets consisting of the length of a ferrite bar and the number of ferrite bars. More specifically, the present experiment is conducted in an order such that i) first, an optimal set of the length of a ferrite bar and the number of ferrite bars satisfying target efficiency of 87% is determined, and ii) 10 samples of the secondary coil assembly are fabricated from the determined optimal set to confirm (verify) the z value.

Figure 19:
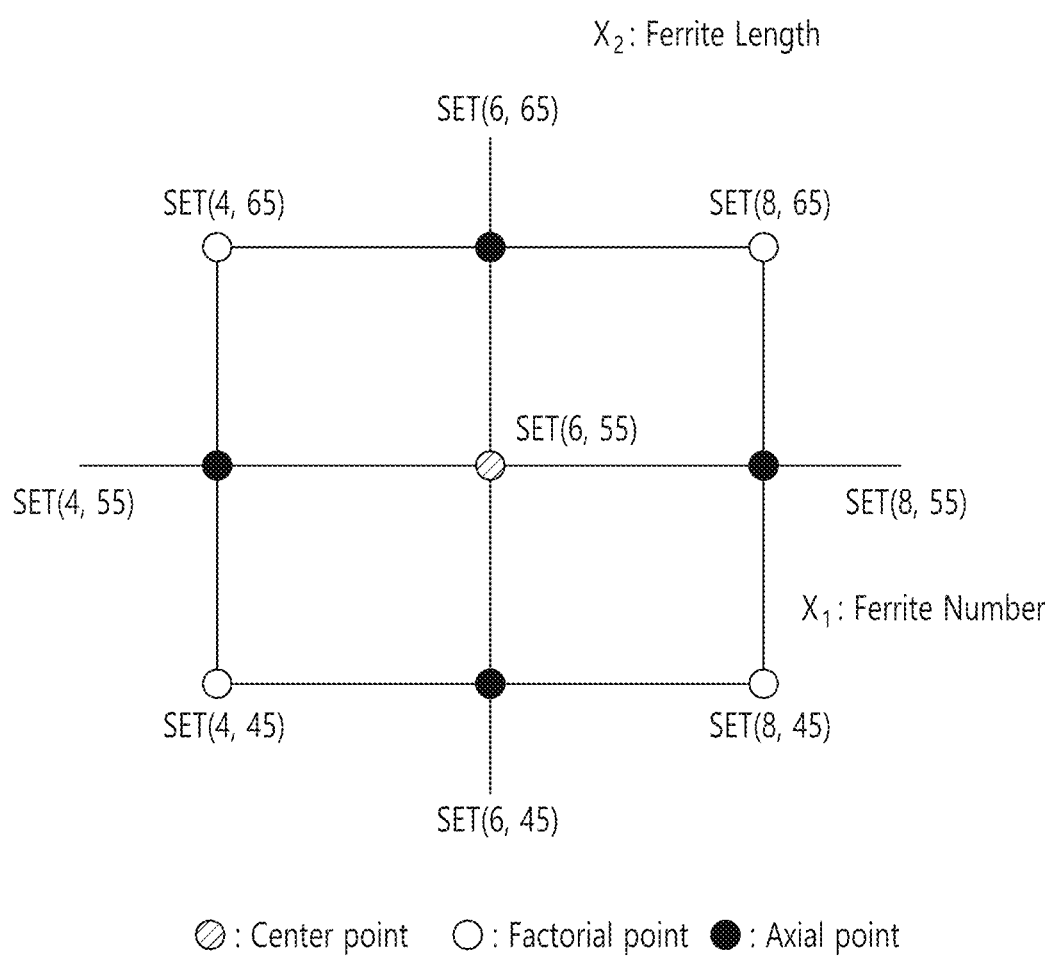
FIG. 19 illustrates an experimental method using central composite design according to one embodiment.

1) Determination of an optimal set consisting of the length of a ferrite bar and the number of ferrite bars satisfying target efficiency 87%—Central Composite Design experiment FIG. 19 illustrates an experimental method using central composite design according to one embodiment.

Referring to FIG. 19, a set consisting of the number of ferrite bars and the length of the ferrite bar is denoted by ($X_1$, $X_2$); factors for each set and level for each factor are designed; and $2^2$ FD plus central composite design experiments are conducted.

Considering conditions for the central composite design experiment, fixed factors are determined as follows: transmission output=2000 W, gap=16 mm, outer diameter of the secondary coil=140 mm, inner diameter of the secondary coil=42 mm, and eccentricity=25 mm. The other factors are as follows.

factors: 2
base runs: 13
base blocks: 1
replicates: 1
Total runs: 13
Total blocks: 1
Two-level factorial: Full factorial
Cube points: 4
Center points in cube: 5
Axial points: 4
Center points in axial: 0
Alpha: 1

To examine the number of central composite design experiments, the experiment is repeated five times at the center point (6, 55); four times at the four factorial points of SET(4, 65), SET(4, 45), SET(8, 65), and SET(8, 45); and four times at the four axial points (face centered) of SET(4, 55), SET(6, 65), SET(8, 55), and SET(6, 45). After conducting a total of 13 experiments, a result is obtained as shown in FIG. 20.

FIG. 20 is a table showing an experimental result of FIG. 19.

Referring to FIG. 20, when efficiency is measured with respect to 13 sets consisting of the length of the ferrite bar and the number of ferrite bars, the total number of sets exhibiting efficiency of more than 85% is turned out to be 3: {(6, 65), (8, 65), (8, 55)}.

Figure 21:
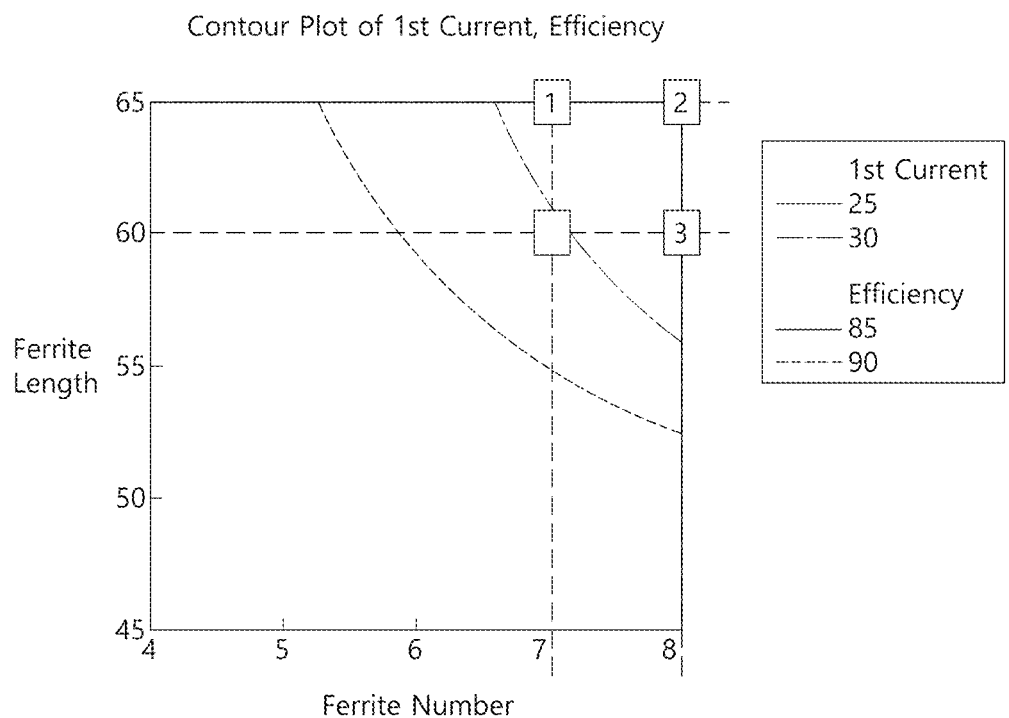
FIG. 21 is an overlaid contour plot illustrating a relationship between ferrite number and ferrite length.

The sets above are indexed again sequentially with a set number 1, 2, 3, and to find the best expected point (or expected area), a relationship between the number of ferrite bars and the length of the ferrite bar is displayed in an overlaid contour plot as shown in FIG. 21.

Referring to FIG. 21, it may be noticed that there is an area in the overlaid contour plot, where the resonance current in the integrated transmitting coil is less than 30 A(rms) and target efficiency is larger than 85%. Here, it is found that the set consisting of the optimal ferrite number and the optimal ferrite length showing the highest efficiency is set number 2 (efficiency of 86.96%). Therefore, an actual sample is fabricated with a priority to the set number 2, after which verification is conducted.

2) Fabrication of 10 samples of the secondary coil assembly according to the optimal set and confirmation (verification) of the z value After fabricating 10 samples of the secondary coil assembly according to the set (8, 65), efficiency and the resonance current are measured, and verification is conducted, after which results shown in FIGS. 22A to 23B are obtained. The experimental conditions are such that coil-to-coil gap=16 mm and eccentricity=25 mm (30%).

Figure 22B:
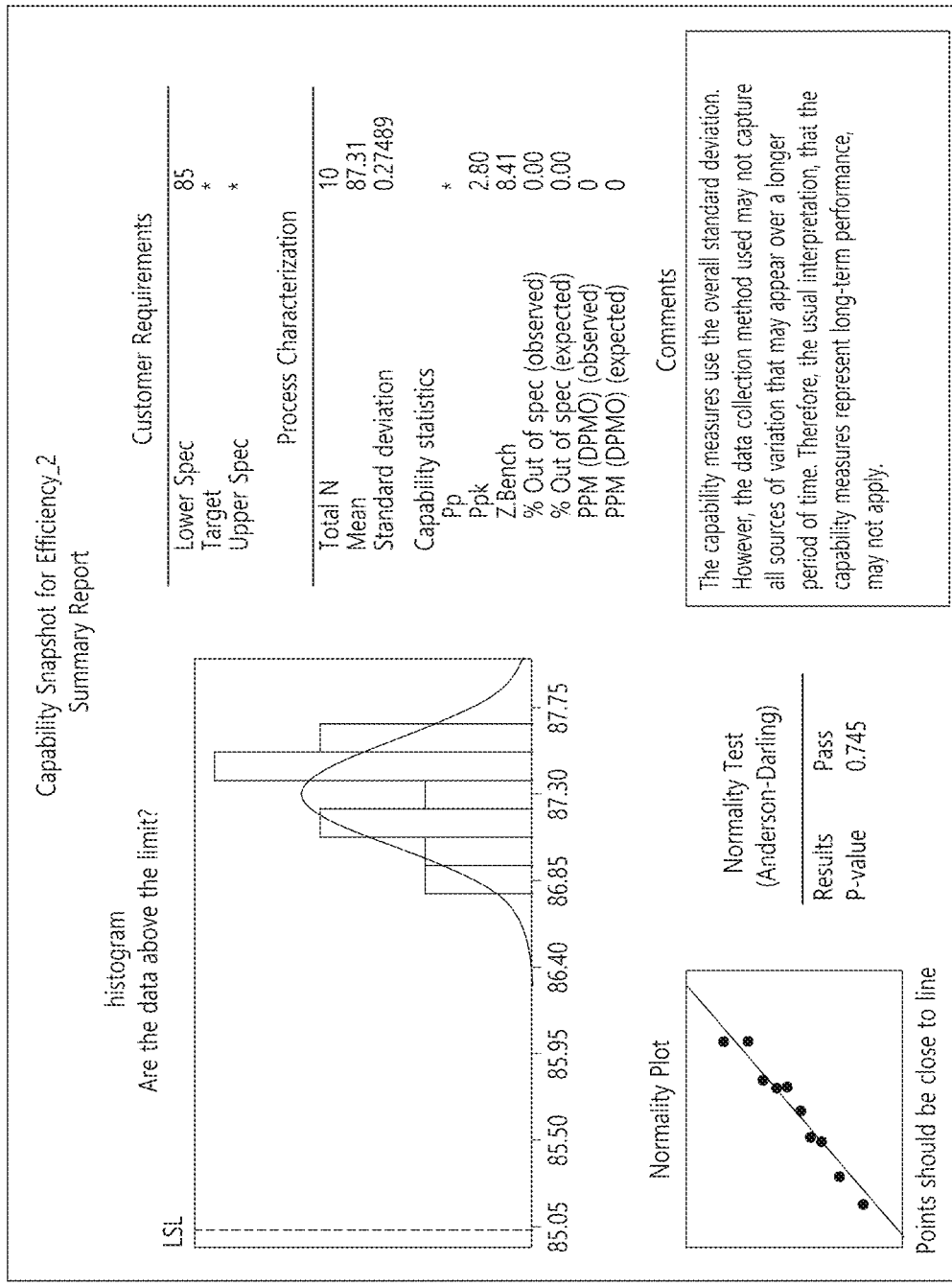
FIG. 22B is a report on a verification result for the samples.

FIG. 22A shows efficiency measured for each sample in an experiment according to one example, and FIG. 22B is a report on a verification result for the samples. Here, Assy #denotes the sample number.

Referring to FIGS. 22A and 22B, average efficiency measured from the 10 samples is 87.31%, standard deviation is 0.27469, and normality P-value is 0.745. Here, since the z value is 8.41 (>4.5), it is confirmed that the aforementioned set satisfies efficiency requirements applied to the present experiment and passes an efficiency test as shown in FIG. 22B.

Figure 23B:
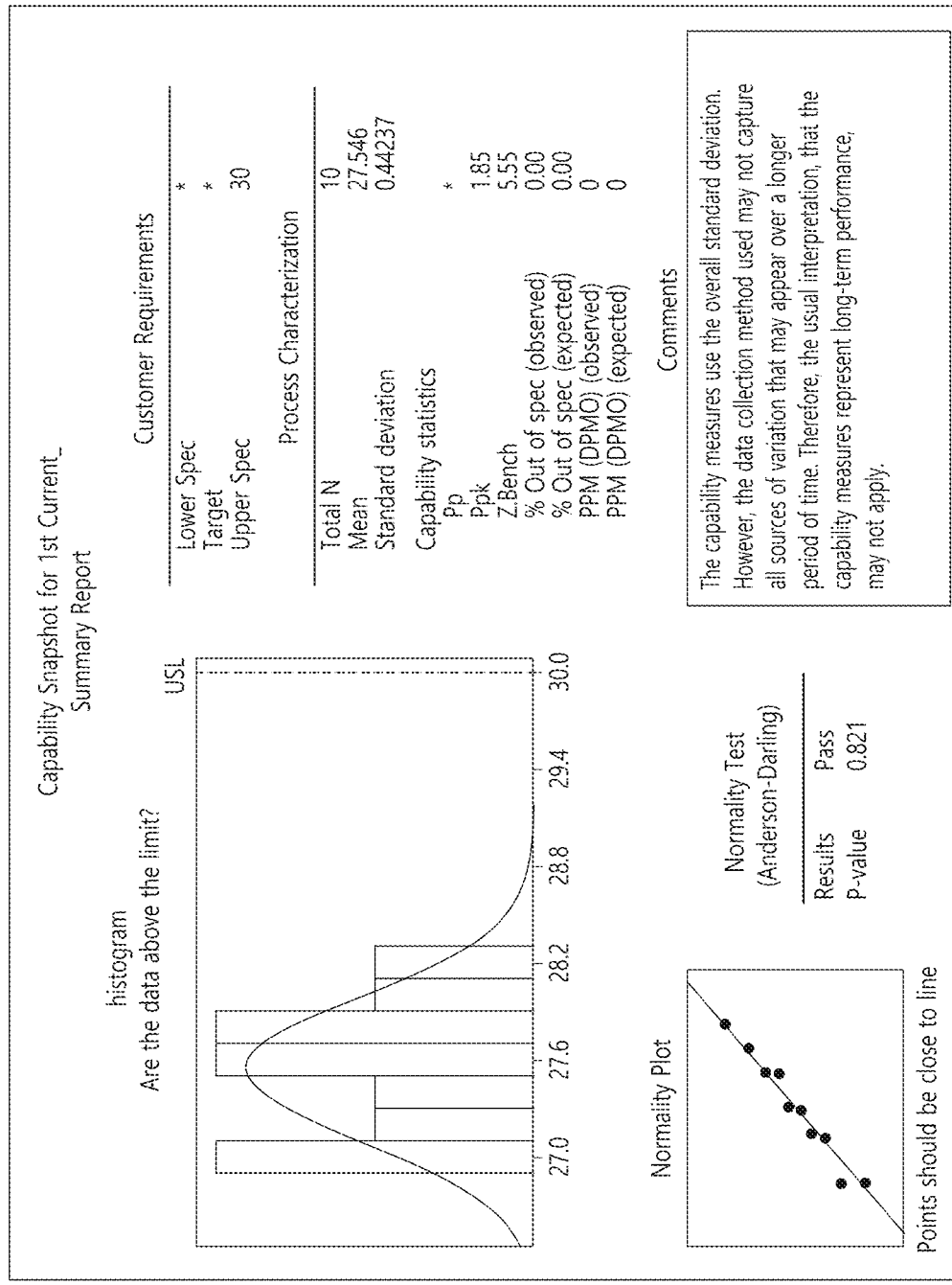
FIG. 23B is a report on a verification result for the samples.

FIG. 23A shows a resonance current in an integrated transmitting coil measured for each sample in an experiment of one example, and FIG. 23B is a report on a verification result for the samples. Here, Assy #denotes the sample number.

Referring to FIGS. 23A and 23B, the resonance current in the integrated transmitting coil measured from the 10 samples is 27.546 A(rms), standard deviation is 0.44237, and normality P-value is 0.821. Here, since the z value is 5.55 (>4.5), it is confirmed that the aforementioned set satisfies resonance current requirements applied to the present experiment and passes an efficiency test as shown in FIG. 23B.

Since the aforementioned set is determined as the optimal set under the eccentricity condition, it is verified again whether the same set still satisfies the design goals for efficiency and the resonance current under the true centering condition.

In other words, after fabricating 10 samples of the secondary coil assembly according to the set (8, 65) under the true centering condition, efficiency and the resonance current are measured, and verification is conducted, after which results shown in FIGS. 24A to 25B are obtained. The experimental conditions are such that coil-to-coil gap=16 mm and eccentricity=0 mm (0%).

Figure 24B:
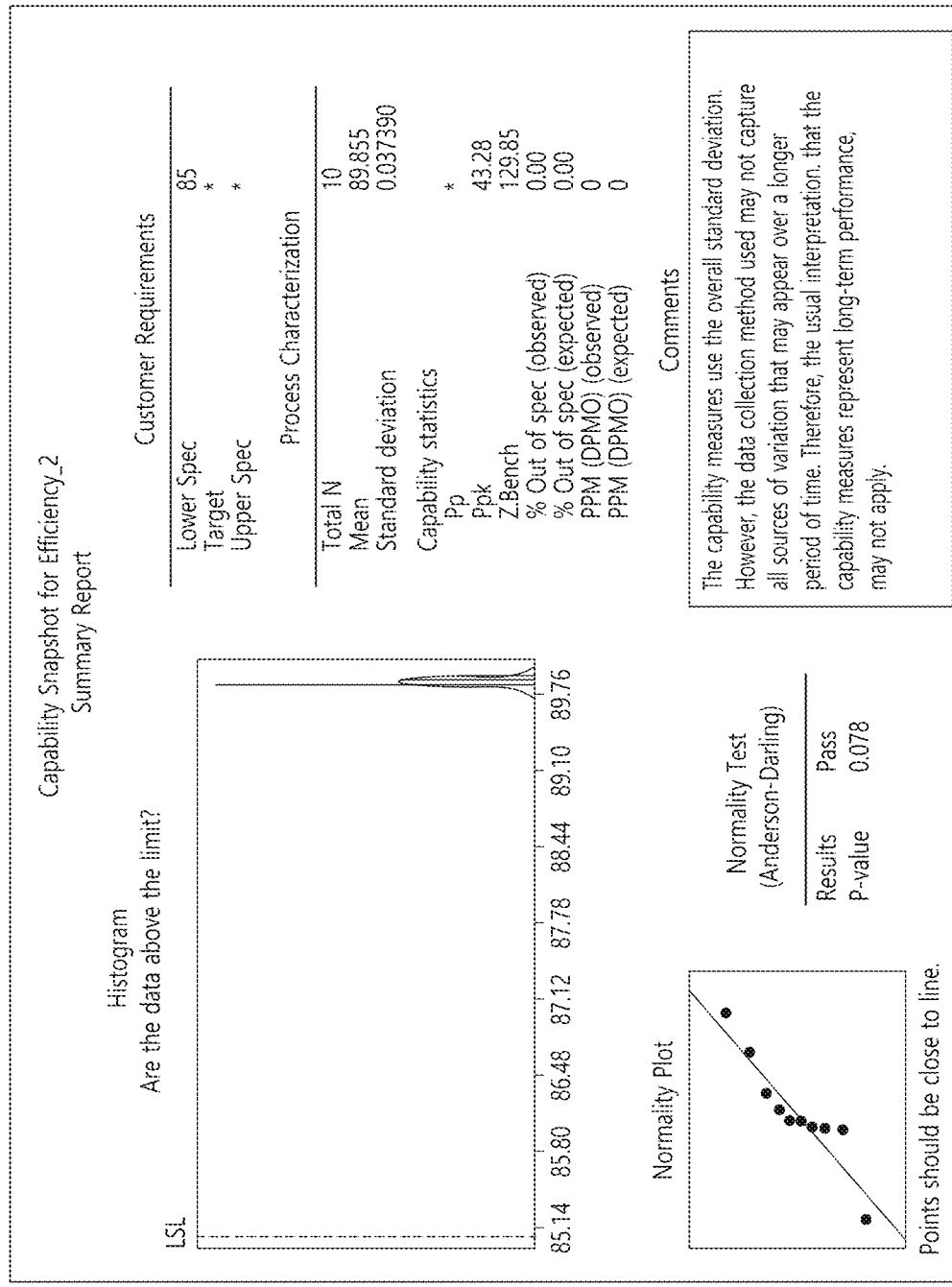
FIG. 24B is a report on a verification result for the samples.

FIG. 24A shows efficiency measured for each sample in an experiment according to another example, and FIG. 24B is a report on a verification result for the samples. Here, Assy #denotes the sample number.

Referring to FIGS. 24A and 24B, average efficiency measured from the 10 samples is 89.855%, standard deviation is 0.03739, and normality P-value is 0.078. Here, since the z value is 129.85 (>4.5), it is confirmed that the aforementioned set satisfies efficiency requirements applied to the present experiment and passes an efficiency test as shown in FIG. 24B.

Figure 25B:
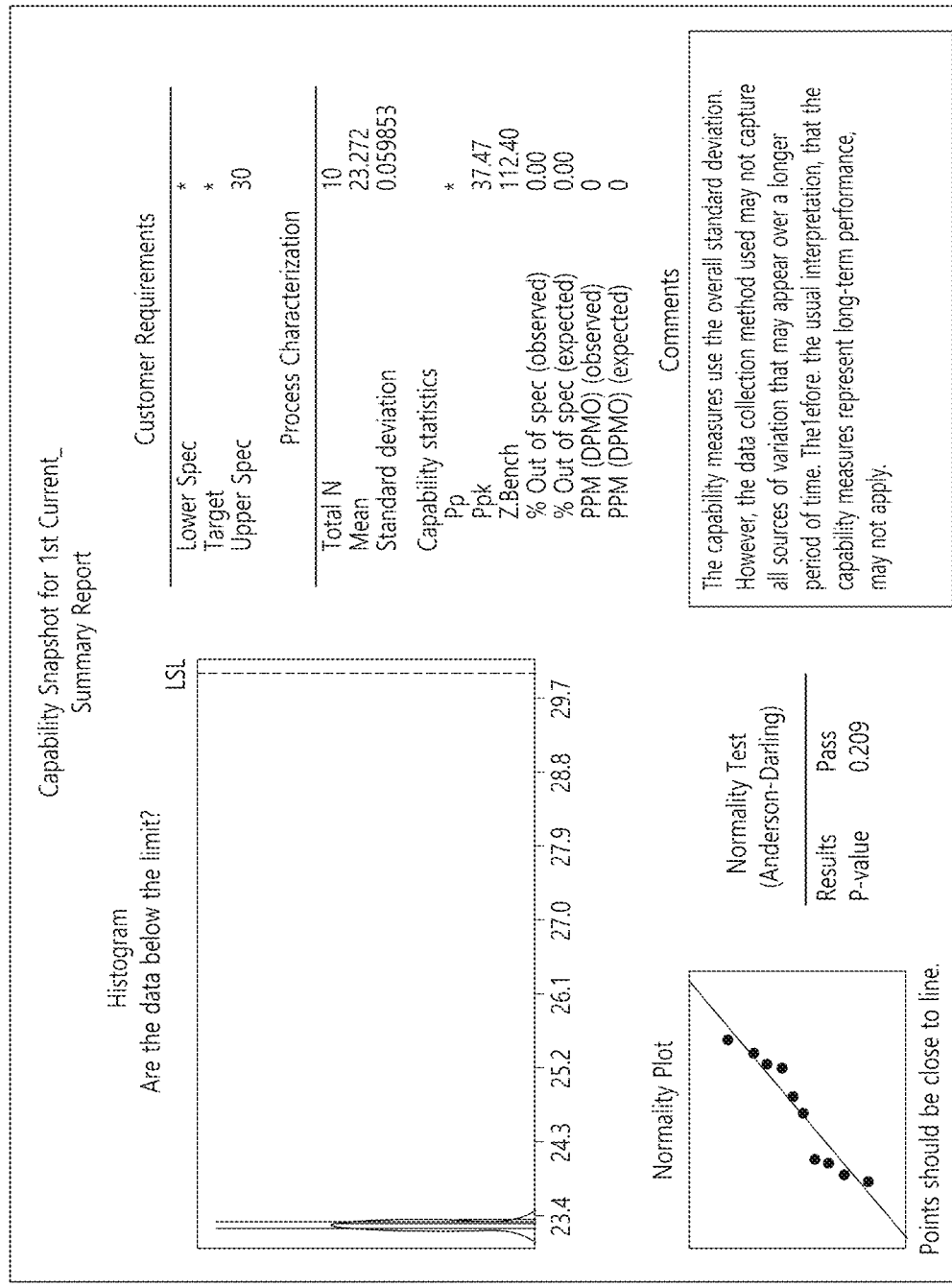
FIG. 25B is a report on a verification result for the samples.

FIG. 25A shows a resonance current in an integrated transmitting coil measured for each sample in an experiment of another example, and FIG. 25B is a report on a verification result for the samples. Here, Assy #denotes the sample number.

Referring to FIGS. 25A and 25B, the resonance current in the integrated transmitting coil measured from the 10 samples is 23.272 A(rms), standard deviation is 0.059853, and normality P-value is 0.209. Here, since the z value is 112.4 (>4.5), it is confirmed that the aforementioned set satisfies resonance current requirements applied to the present experiment and passes an efficiency test as shown in FIG. 25B.

The preferred electric/physical design parameters for the secondary coil assembly designed according to the experimental results above are summarized in Table 6.

TABLE 6

| | |
|---|---|
| Resonance frequency | 29 kHz(0.26 uF) |
| Number of turns | 28 turns |
| Inductance | 112.6 uH |
| Size of magnetic circuit (ferrite bar) | 65 × 15 × 5T |
| Number of magnetic circuits(ferrite bar) | 8 |

Also, a comparison result of the preferred electric/physical design parameters of the secondary coil assembly designed according to the present experimental results with those from another comparison group are shown in FIG. 26. FIG. 26 shows a comparison result of electric/physical design parameters of a secondary coil assembly according to a preferred embodiment with a comparison group. More specifically, the figure shows a comparison result of efficiency and a resonance current in the integrated transmitting coil according to the length of a ferrite bar and the number of ferrite bars in the cases of eccentricity and true centering.

Referring to FIG. 26, (a) shows a measurement result of the efficiency and the resonance current in the integrated transmitting coil in the cases of eccentricity and true centering when the number of ferrite bars is 8 and the length of each ferrite bar is 65 mm And (b) shows a measurement result of the efficiency and the resonance current in the integrated transmitting coil in the cases of eccentricity and true centering when the number of ferrite bars is 8 and the length of each ferrite bar is 60 mm.

Comparing (a) with (b), it may be noticed that higher efficiency is observed in the case of (a), which indicates that if the length of the ferrite bar is long, higher efficiency may still be achieved even in the case of eccentricity.

Since the wireless power transmitting method and apparatus or the wireless power receiver and method according to an embodiment of the present disclosure do not necessarily include all the elements or operations, the wireless power transmitter and method and the wireless power transmitter and method may be performed with the above-mentioned components or some or all of the operations. Also, embodiments of the above-described wireless power transmitter and method, or receiving apparatus and method may be performed in combination with each other. Also, each element or operation described above is necessarily performed in the order as described, and an operation described later may be performed prior to an operation described earlier.

The description above is merely illustrating the technical spirit of the present disclosure, and various changes and modifications may be made by those skilled in the art without departing from the essential characteristics of the present disclosure. Therefore, the embodiments of the present disclosure described above may be implemented separately or in combination with each other.

Therefore, the embodiments disclosed in the present disclosure are intended to illustrate rather than limit the scope of the present disclosure, and the scope of the technical spirit of the present disclosure is not limited by these embodiments. The scope of the present disclosure should be construed by claims below, and all technical spirits within a range equivalent to claims should be construed as being included in the right scope of the present disclosure.

What is claimed is:
1. A wireless power transmitter comprising:
an integrated transmitting coil configured to transmit wireless power to a wireless power receiver through magnetic coupling with a secondary coil installed in the wireless power receiver or heat external objects;

a magnetic circuit disposed on one surface of the integrated transmitting coil;

a shielding member supporting the integrated transmitting coil and the magnetic circuit;

a power conversion unit including an inverter being connected to the integrated transmitting coil to drive the integrated transmitting coil; and a communication & control unit configured to control the integrated transmitting coil in one of a heating mode or a wireless power transmission mode and perform communication with the wireless power receiver, wherein, based on outer diameter ϕ of the secondary coil ranges from 13 to 16 cm and the wireless power receiver belongs to a class of output ranging from 1500 W to 2000 W, operating frequency of the integrated transmitting coil is higher than operating frequency for a class of higher output than the class, and inductance of the integrated transmitting coil is smaller than the value required by a class of higher output than the class.

2. The wireless power transmitter of claim 1, wherein electric or physical parameters of the integrated transmitting coil and the secondary coil are designed to be associated with each other so that the wireless power receiver receives power ranging from 1500 W to 2000 W with efficiency of more than 90%.

3. The wireless power transmitter of claim 1, wherein magnetic coupling coefficient between the integrated transmitting coil and the secondary coil is 0.65.

4. The wireless power transmitter of claim 1, wherein inductance of the integrated transmitting coil is 44 μH or 45 μH, and inductance of the secondary coil is 90 μH.

5. The wireless power transmitter of claim 1, wherein operating frequency of the integrated transmitting coil ranges from 30 to 40 kHz.

6. The wireless power transmitter of claim 5, wherein operating frequency of the integrated transmitted coil is 37 kHz.

7. The wireless power transmitter of claim 1, wherein outer diameter of the secondary coil is 14 cm.

8. A wireless power receiver comprising:

a secondary coil configured to receive wireless power from a wireless power transmitter through magnetic coupling with an integrated transmitting coil installed in the wireless power transmitter;

a magnetic circuit disposed on one surface of the secondary coil;

a shielding member supporting the secondary coil and the magnetic circuit;

a power pickup unit including a rectifier circuit rectifying an AC signal due to wireless power received by the secondary coil into a DC signal; and a communication & control unit configured to control transmission of the wireless power and perform communication with the wireless power transmitter, wherein outer diameter ϕ of the secondary coil ranges from 13 to 16 cm, the wireless power receiver belongs to a class of output ranging from 1500 W to 2000 W, operating frequency for receiving wireless power is higher than operating frequency for a class of higher output than the class, and inductance of the secondary coil is smaller than the value required by a class of higher output than the class.

9. The wireless power receiver of claim 8, wherein the number of turns of the secondary coil is 28 turns.

10. The wireless power receiver of claim 8, wherein electric or physical parameters of the secondary coil and the magnetic circuit are designed so that transmission efficiency of 87% is achieved, based on the secondary coil being eccentric by 25 mm from the integrated transmitting coil.

11. The wireless power receiver of claim 8, wherein electric or physical parameters of the secondary coil and the magnetic circuit are designed so that a resonance current of the integrated transmitting coil becomes 27 A(rms), based on the secondary coil being eccentric by 25 mm from the integrated transmitting coil.

12. The wireless power receiver of claim 8, wherein outer diameter ϕ of the secondary coil is 14 cm, and inner diameter thereof is 4 cm.

13. The wireless power receiver of claim 8, wherein the magnetic circuit includes at least one ferrite bar, length of the at least one ferrite bar is at least 60 mm, and the number of ferrite bars is at least 7.

14. The wireless power receiver of claim 13, wherein length of the at least one ferrite bar is 65 mm, and the number of ferrite bars is 8.

15. The wireless power receiver of claim 8, wherein distance between the integrated transmitting coil and the secondary coil is designed to be 16 mm.

* * * * *